United States Patent
Onuki et al.

[11] Patent Number: 5,335,032
[45] Date of Patent: Aug. 2, 1994

[54] IMAGE STABILIZING APPARATUS

[75] Inventors: Ichiro Onuki; Masao Shikaumi, both of Kawasaki, Japan

[73] Assignee: Canon Kabushiki Kaisha, Tokyo, Japan

[21] Appl. No.: 872,886

[22] Filed: Apr. 23, 1992

[30] Foreign Application Priority Data

Apr. 26, 1991 [JP] Japan .................. 3-122991
Apr. 26, 1991 [JP] Japan .................. 3-122993

[51] Int. Cl.⁵ .................. G03B 1/18; G03B 3/00; G03B 17/00; H04N 5/232
[52] U.S. Cl. .................. 354/195.1; 354/400; 354/202; 348/208
[58] Field of Search .................. 354/195.1, 202, 430

[56] References Cited

U.S. PATENT DOCUMENTS

| | | | |
|---|---|---|---|
| 4,970,540 | 11/1990 | Vasey et al. | 354/202 |
| 5,072,251 | 12/1991 | Tamura et al. | 354/430 |
| 5,084,724 | 1/1992 | Maeno | 354/430 |
| 5,101,230 | 3/1992 | Shikaumi et al. | 354/430 |
| 5,107,293 | 4/1992 | Sekine et al. | 354/430 |
| 5,117,246 | 5/1992 | Takahashi et al. | 354/202 |
| 5,172,233 | 12/1992 | Yoshihara et al. | 358/222 |

*Primary Examiner*—Russell E. Adams
*Assistant Examiner*—Nicholas J. Tuccillo
*Attorney, Agent, or Firm*—Robin, Blecker, Daley and Driscoll

[57] ABSTRACT

An image stabilizing apparatus comprises a light beam deflecting device controllable for deflecting a light beam by moving an optical member disposed in an optical path, an accelerometer for detecting an influence the optical member receives from gravity and a control device for controlling the operation of the light beam deflecting device by the use of the output of the accelerometer so as to provide image stabilization.

28 Claims, 14 Drawing Sheets

IMAGE STABILIZING APPARATUS

BACKGROUND OF THE INVENTION

1. Field of the Invention

This invention relates to an image stabilizing apparatus for deflecting a light beam by moving an optical member disposed in an optical path, thereby effecting image stabilization.

2. Related Background Art

There are U.S. Pat. No. 4,914,098 and U.S. patent application Ser. No. 259,787 as apparatuses for the image stabilization of a camera. In the former, there is shown the support of a correction optical system which is light beam deflecting means for image stabilization, and in the latter, there is shown the control thereof. Further, the latter has the following means:

1) means for centering the correction optical system to the home position (the central position in the movable range) prior to the start of image stabilization; and 2) means for creating a centripetal force (hereinafter referred to as the slow center feedback) which decreases the great displacement of the correction optical system caused by great vibration or the panning operation.

Of these, the means 2) is widely useful for popular image stabilizing instruments and is an indispensable technique. On the other hand, the means 1) is a countermeasure for the fact that in the embodiment of the above-mentioned U.S. application, the correction optical systems is urged against a driving cam by a strong spring and is always subjected to a great extraneous force. That is, to drive the correction optical system near the central position in the movable range, the slow center feedback action alone mentioned under item 2) above is insufficient.

However, the above-mentioned patent application suffers from the following disadvantages for the centering operation before the start of image stabilization:

a) A sudden movement of the finder image field occurs to give a feeling of physical disorder to the photographer;

b) The photographer feels the shock by the reaction of the centering operation; and c) Centering means and a circuit for sampling and holding a center holding signal are required.

In order to eliminate these disadvantages, Applicant further filed Japanese Laid-Open Patent Application No. 3-37619.

The invention of this application is such that the bearing force of a correction optical system and a driving cam is dealt with as the internal force between the two and a torque produced in the cam is by said bearing force negated. According to this application, the centering operation mentioned under item 1 above is not necessary and good image stabilization becomes possible by only the slow center feedback mentioned under item 2) above.

However, again in the apparatus of the above-mentioned Japanese Laid-Open Patent Application No. 3-37619, the average position of the correction optical system during image stabilization creates some deviation relative to the origin position, because in the above-mentioned application, the influence of the urging spring force against the cam is eliminated, but the influence of gravity by the mass of the correction optical system remains and this acts as disturbance on a feedback loop. To eliminate the problem of this deviation of the average position by gravity, the following method would occur to mind:

(1) To strengthen the slow center feedback;

(2) To heighten the servo gain (open-loop transfer function) of the feedback loop; and (3) To detect the average position of the correction optical system during image stabilization and apply a correction signal to the feedback loop.

However, the method (1) adversely affects the image stabilizing ability of low frequency, and the method (2) causes the oscillation of the feedback loop and therefore, both of these methods have a limit in countermeasure.

Also, the method (3), as shown in the known example of Japanese Patent Publication No. 56-45124, the mean value of the time of the displacement of the correction optical system is detected and the correction thereof conforming to the amount of vibration is applied, and this leads to the problem that a certain time is inevitable until this action begins to work. There is also the problem that correction is effected even when the photographer effects panning or the like and great displacement occurs to the correction optical system.

Also, in this apparatus, when deviation in one direction occurs for a long time due to panning or the like, correction is effected with the time length of this deviation also taken into account and therefore, for example, only the steady deviation by gravity or the like is not strictly corrected, but this apparatus was, as it were, a modification of the slow center feedback.

SUMMARY OF THE INVENTION

One aspect of the invention is to provide detecting means for detecting the influence of gravity upon the optical member of an image stabilizing apparatus for moving an optical member disposed in an optical path to thereby deflect a light beam, and perform the image stabilizing operation by the use of the output of said detecting means. By this, it becomes possible to eliminate the influence of gravity upon the image stabilizing operation from immediately after the start of the image stabilization.

One aspect of the invention is to provide, in an image stabilizing apparatus wherein an optical member is moved within a movable range and a light beam is deflected to thereby effect image stabilization, detecting means for detecting the arrival of said movable optical member at a set moved position, and perform the image stabilizing operation in conformity with the result of the detection. By such a construction, it becomes possible to use the movable range of light beam means effectively and effect image stabilization.

DESCRIPTION OF THE PREFERRED EMBODIMENTS

Figure 1:
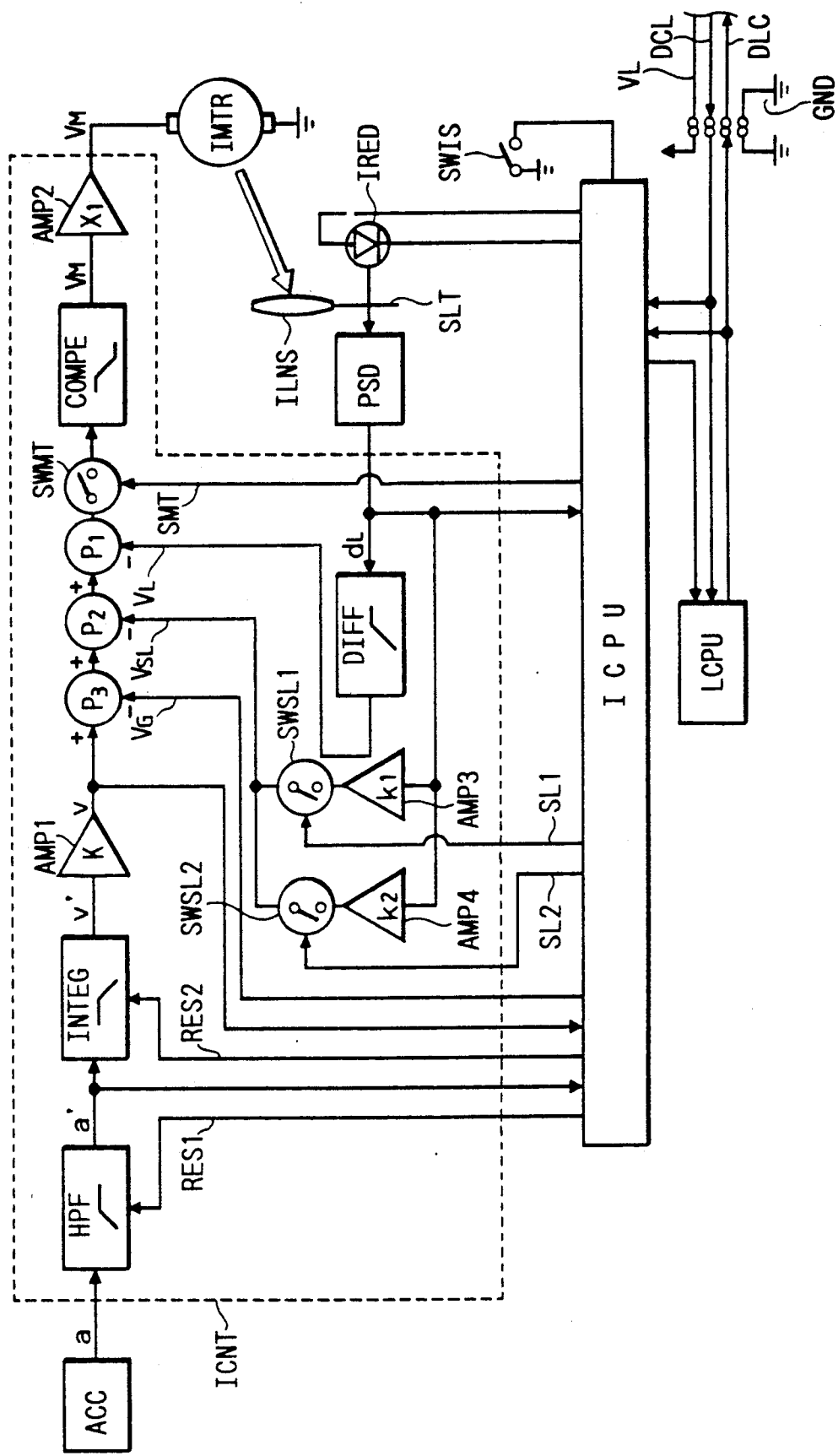
FIG. 1 is a block diagram showing an image stabilization control circuit in a first embodiment of the present invention and its surrounding circuits.

The present invention will hereinafter be described in detail with respect to some embodiments thereof shown in the drawings.

Figure 2:
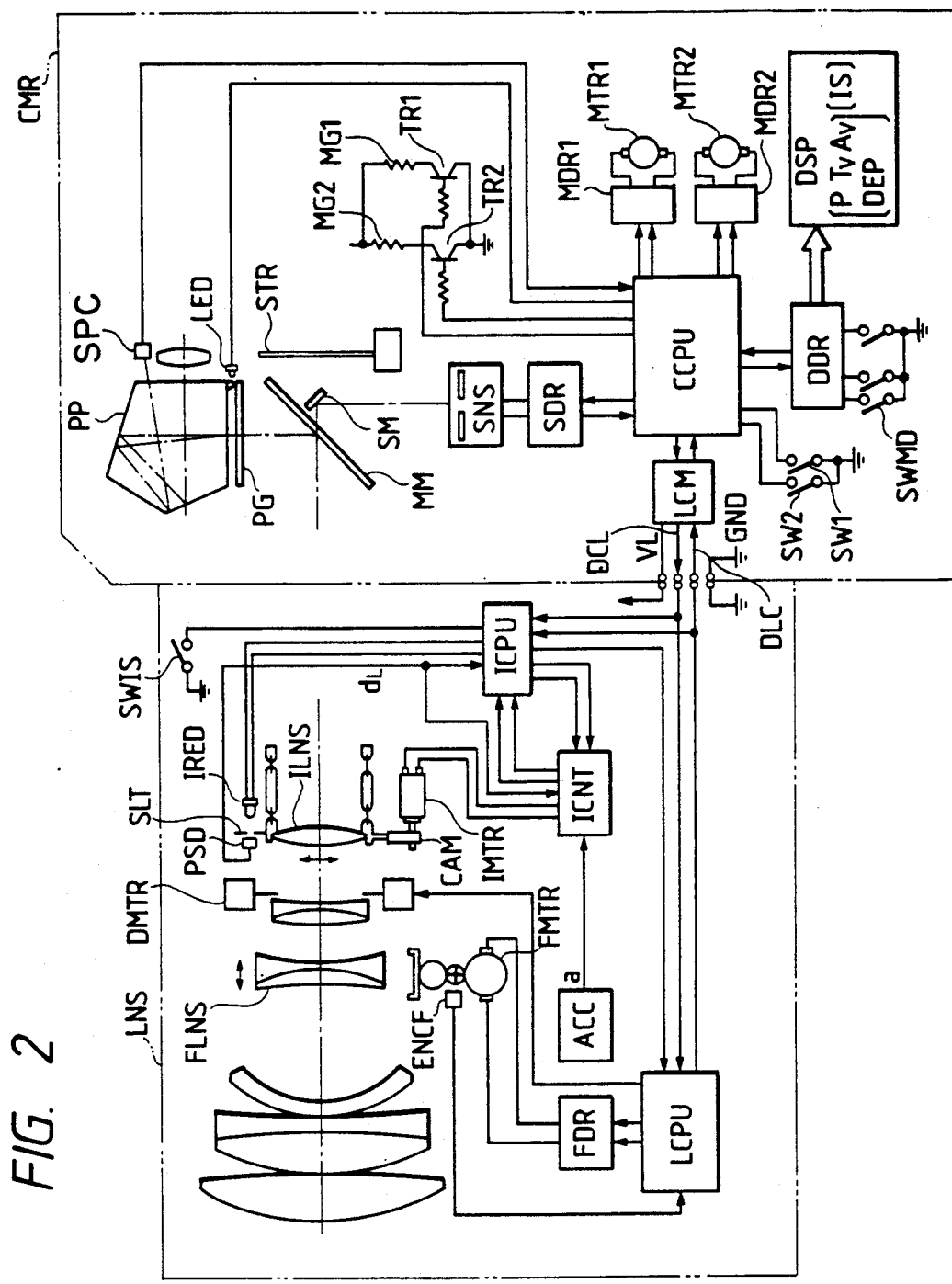
FIG. 2 is a schematic diagram showing a single-lens reflex camera provided with an apparatus according to the first embodiment of the present invention.

FIG. 2 shows the constructions of the essential portions of a single-lens reflex camera provided with a first embodiment of the present invention.

In FIG. 2, CMR designates a camera body, and LNS denotes an interchangeable lens removably mountable with respect to the camera body CMR.

The construction of the camera body CMR side will first be described.

CCPU designates a microcomputer in the camera which is a 1-chip microcomputer having an ROM, an RAM and A/D, D/A converting function. The microcomputer CCPU in the camera performs a series of operations of the camera such as automatic exposure control, automatic focus adjustment and film winding in accordance with the sequence program of the camera stored in the ROM. For that purpose, the microcomputer CCPU in the camera communicates with its peripheral circuits in the camera body CMR and the lens, and controls the operations of each circuit and the lens.

LCM denotes a lens communication buffer circuit which supplies a power source to the lens LNS by a power source line VL and provides an inter-lens communication buffer for an output passed through a signal line DCL from the camera body CMR to the lens LNS and an output passed through a signal line DLC from the lens LNS to the camera body CMR.

SNS designates a focus detecting line sensor (hereinafter simply referred to as the sensor) comprised of a CCD or the like, and SDR denotes a driving circuit therefor which drives the sensor SNS by a command from the microcomputer CCPU in the camera, and introduces and amplifies an image signal from the sensor SNS and delivers it to the microcomputer CCPU in the camera.

Light from the lens LNS enters a photometry sensor SPC via a main mirror MM, focusing glass PG and a pentagonal prism PP, and the output signal thereof is input to the microcomputer CCPU in the camera and is used for automatic exposure control (AE) in accordance with a predetermined program.

DDR denotes a switch detecting and display circuit which changes over the display of the display member DSP of the camera on the basis of data sent from the microcomputer CCPU in the camera and informs the microcomputer CCPU in the camera of the ON or OFF state of the various operating members (SWMD) of the camera by communication.

SW1 and SW2 designate switches operatively associated with a release button, not shown. The switch SW1 is closed by the first-stage depression of the release button, and the switch SW2 is closed by the second-stage depression of the release button. The microcomputer CCPU in the camera, as will be described later, produces a signal for starting photometry, the automatic focus adjusting operation and the image stabilizing operation upon closing of the switch SW1, and effects exposure control and film winding with the closing of the switch SW2 as a trigger. The switch SW2 is connected to the "interruption input terminal" of the microcomputer CCPU in the camera, and even when the program is being executed during the closing of the switch SW1, interruption is applied by the closing of the switch SW2 and shift can be immediately made to a predetermined interruption program.

MTR1 denotes a film feeding motor, and MTR2 designates a mirror up-down and shutter spring charging motor. The control of the forward and reverse rotations of these motors is effected by driving circuits MDR1 and MDR2.

MG1 and MG2 designate magnets for starting the movement of forward and rearward shutter blades. The magnets MG1 and MG2 are electrically energized by amplifying transistors TR1 and TR2, respectively, and the control of a shutter STR is effected by the microcomputer CCPU in the camera.

The construction of the lens LNS side will now be described.

LCPU denotes a microcomputer in the lens which, like the microcomputer CCPU in the camera, is a 1-chip microcomputer having an ROM, an RAM and A/D, D/A converting function. The microcomputer LCPU in the lens effects the driving control of a focus adjusting lens FLNS and the driving control of the aperture in accordance with a command sent from the camera body CMR through the signal line DCL. Also, the microcomputer LCPU in the tens transmits the various operational situations (how much a focus adjusting optical system has been driven, how many steps the aperture has been stopped down, etc.) and parameters (fully open F number, focal length, the coefficient of defocus amount vs. amount of axial movement, etc ) of the lens of the focusing lens to the camera side through the signal line DLC.

FMTR designates a motor for driving the focus adjusting lens FLNS. The motor FMTR rotates a helicoid ring, not shown, through a gear train, and moves the lens FLNS back and forth in the direction of the optical axis thereof to thereby effect focus adjustment.

FDR denotes a driving circuit for the motor FMTR. The driving circuit FDR effects the control of the forward and reverse rotations of the motor FMTR, a brake, etc. in accordance with a signal from the microcomputer LCPU in the lens.

In the present embodiment, there is shown an example of the inner focus type, and when a command for focus adjustment is sent from the camera body CMR, the motor FMTR is driven in accordance with the amount and direction of driving sent at the same time to thereby move the focus adjusting lens FLNS in the direction of the optical axis and effect focus adjustment. The amount of movement of the focus adjusting lens FLNS is monitored by the pulse signal of an encoder circuit ENCF and is counted by a counter in the microcomputer LCPU in the lens, and the motor FMTR is controlled at a point of time whereat predetermined movement has been completed.

Therefore, after the command for focus adjustment has once been sent from the camera body CMR, it is not necessary at all for the microcomputer CCPU in the camera to be concerned in lens driving until the driving of the lens is terminated. Also, design is made such that it is possible to deliver the content of the counter to the camera body CMR as required.

When a command and for aperture control is sent from the camera a body CMR, a stepping motor DMTR conventional as a motor for aperture driving is driven in accordance with the number of steps of the aperture sent at the same time.

ICPU designates an image stabilizing microcomputer for controlling the image stabilizing operation. A signal DCL from the camera body CMR to the lens LNS and a signal DLC from the lens LNS to the camera body CMR are input to the image stabilizing microcomputer ICPU, and the output signal from the microcomputer ICPU is input to the microcomputer LCPU in the lens. That is, there is adopted such a form that the communication with the microcomputer CCPU is effected only with the microcomputer LCPU in the lens and the image stabilizing microcomputer ICPU picks up the communication between the two. The communication from the image-stabilizing microcomputer ICPU to the microcomputer CCPU in the camera is effected through the microcomputer LCPU in the lens.

ACC denotes an angular acceleration meter for detecting the vibration of the lens LNS. The angular acceleration meter ACC outputs an angular acceleration signal a to an image stabilization control circuit ICNT which will be described later.

ICNT designates an image stabilization control circuit (the details of which will be described later) which has an integrator, a filter, an amplifier, a switch, etc. and drive-controls an image stabilizing motor IMTR which will be described later, and has input and output lines for the signal with PSD and the image stabilizing microcomputer ICPU for that purpose.

ILNS denotes a correction optical system which is an optical member disposed in the optical path and which is supported by a link mechanism which will be described later and can be moved substantially in parallelism to a plane perpendicular to the optical axis.

IMTR designates an image stabilizing motor which is light beam deflecting means and which rotates a cam CAM fixed on a motor shaft in forward and reverse directions to thereby displace the correction optical system ILNS.

PSD denotes a position sensor for detecting the position of the correction optical system ILNS. Light from an infrared light emitting diode IRED passes through a slit SLT moved with the correction optical system ILNS and enters the light receiving surface of this position sensor PSD, whereby the position sensor PSD produces a signal dL indicative of the position of the incident light, i.e., the position of the correction optical system ILNS. This output signal dL is input to the image stabilizing microcomputer ICPU and the image stabilization control circuit ICNT.

SWIS designates the main switch of an image stabilizing system. When the switch SWIS is closed, electric power is supplied to the image stabilizing microcomputer ICPU and its surrounding circuits, whereby the image stabilization control circuit ICNT starts to operate. When the switch SW1 of the camera body CMR is then closed, the signal thereof is communicated to the image stabilizing microcomputer ICPU through the microcomputer LCPU in the lens, and the motor IMTR is driven and thus, the image stabilizing operation is started.

The signal dL has previously been described as a signal indicative of the position of the correction optical system ILNS, but since the displacement of the correction optical system ILNS is proportional to the amount of eccentricity of the optical axis attributable thereto, dL may be regarded as the amount of eccentricity (displacement) of the optical axis. The origin of this signal is defined as a position at which the center axis of the correction optical system ILNS coincides with the photographing optical axis.

FIG. 1 shows in detail the image stabilization control circuit ICNT shown in FIG. 2, and the portion encircled by a dotted line corresponds thereto. The substance of this circuit will hereinafter be described.

HPF designates a high-pass filter for cutting the DC component (bias component) of the angular acceleration signal from the angular acceleration meter ACC. The high-pass filter HPF produces an angular acceleration signal a'.

INTEG denotes an integrator for integrating the above-mentioned angular acceleration signal a', and the output v' thereof represents the angular velocity of vibration occurring in the lens LNS.

AMP1 designates a coefficient converting amplifier for converting the angular velocity v' of the vibration of the lens LNS into a driving velocity command signal v for the correction optical system ILNS. The signal v is input to a switch SWMT which will be described later via addition points P3, P2 and P1.

The switch SWMT is a switch for ON-OFF-controlling the inputting of a control signal to the motor IMTR, and is controlled by the image stabilizing microcomputer ICPU, and when the switch SWMT is closed, the driving of the motor IMTR is started and the image stabilizing operation is started.

COMPE denotes a phase compensating circuit for increasing the degree of stability of the feedback loop system, and the output signal VM thereof provides an applied voltage to the motor IMTR, and this corresponds to a driving velocity command signal for the motor IMTR.

AMP2 designates a power buffer for supplying an electric current to the motor IMTR.

By the above-described route, the angular acceleration a of the vibration of the lens LNS is converted into an applied voltage VM to the motor IMTR, and when the motor shaft is rotated, the correction optical system ILNS is driven in a direction substantially perpendicular to the optical axis by a cam which will be described later. At this time, the light from the infrared light emitting diode IRED passes through the slit to the position sensor PSD, which thus outputs the position signal (displacement signal) dL of the correction optical system ILNS. This displacement signal dL is input to the image stabilizing microcomputer ICPU, a differentiator DIFF which will be described later, and amplifiers AMP3 and AMP4.

The differentiator DIFF differentiates the displacement signal dL of the correction optical system ILNS and outputs a velocity signal vL. The velocity signal vL is inverted and input to the addition point P1, whereby there is formed a feedback loop using the driving velocity of the correction optical system ILNS as an amount of control.

The amplifiers AMP3 and AMP4 are amplifiers for producing the restitutive force of the correction optical system ILNS to the origin. When the camera or the lens is panned, the image stabilizing apparatus responds to preclude this panning and the correction optical system ILNS uses up its driving stroke. Unless at this time, the correction optical system ILNS is returned to the origin, the image stabilizing operation cannot be resumed. So, design is made such that the displacement signal dL of the correction optical system ILNS is increased to k1 or k2 times and is inverted and input to the addition point P2, whereby a restitutive force to the origin proportional to the displacement signal dL is provided. Switches SWSL1 and SWSL2 are switches for selecting the strength of the restitutive force. These switches are changed over and controlled by the image stabilizing microcomputer ICPU. If k2>k1, when the switch SWSL1 is closed, a weak restitutive force is provided, and when the switch SWSL2 is closed, a strong restitutive force is provided. This kind of effect of these restitutive forces is known in the art as "slow center feedback action".

A signal VG input from the image stabilizing microcomputer ICPU to the addition point P3 is for giving a deflection voltage to the driving velocity command signal v of the correction optical system ILNS which is input to the feedback loop, and is used for the purpose of cancelling, for example, the bias component of the signal v, but in the present invention, this signal VG is utilized as a signal for correcting the influence of gravity (the details of this will be described later).

RES1 and RES2 denote output lines for resetting the high-pass filter HPF and the integrator INTEG and initializing the output signals thereof.

Now, in FIG. 2, the image stabilizing mechanism portion is represented by only one axis, but hand vibration occurs vertically and horizontally, i.e., in two-dimensional directions and therefore, in the actual lens, vibrations in the directions of two axes must be detected and the correction optical system ILNS must be two-dimensionally moved.

Figure 3:
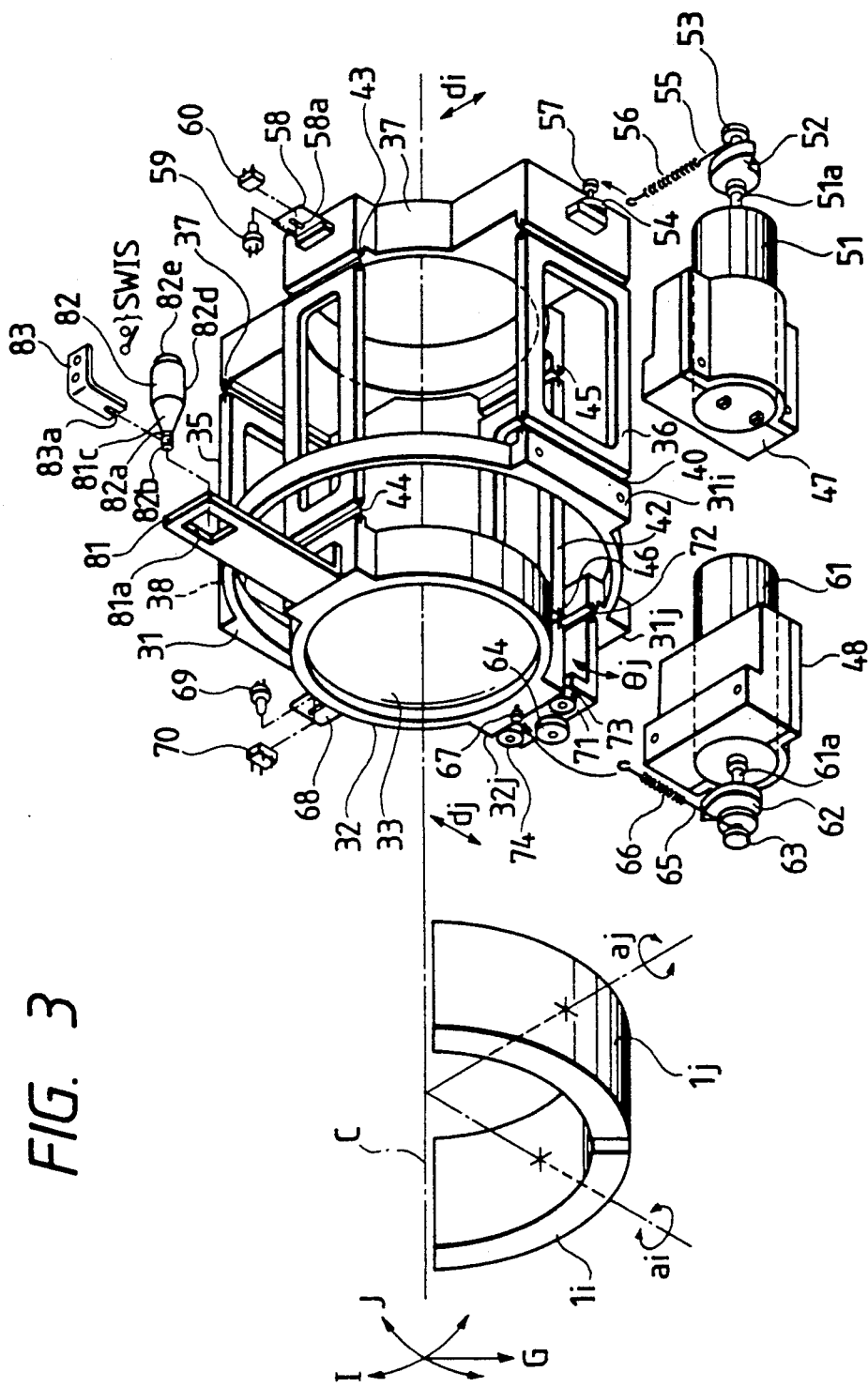
FIG. 3 is a perspective view showing a support mechanism for an optical member in the first embodiment of the present invention.

FIG. 3 shows in detail a support mechanism portion which enables the correction optical system ILNS to be two-dimentionally moved, and is a perspective view of the support mechanism portion as it is seen obliquely from the front thereof on a horizontal plane containing the optical axis. Usually, detection and image stabilization are effected with vibration decomposed into two axes, i.e., a vertical direction (pitch) and a horizontal direction (yaw), but in the present embodiment, the standard axes of image stabilization are set in directions I and J inclined by 45° with respect to said two directions.

In FIG. 3, arrow G indicates the direction of gravity, and li and lj designate angular acceleration meters for detecting the angular vibrations of the optical axis C in the directions I and J, respectively. These angular acceleration meters correspond to the angular acceleration meter ACC of FIG. 2, and the vibration in the direction I, i.e. angular acceleration ai, is detected by the angular acceleration meter li, and the vibration in the direction J, i.e., angular acceleration aj, is detected by the angular acceleration meter lj. The reference numeral 31 denotes a fixed frame fixed to the photo-taking lens body, and the reference numeral 37 designates a movable frame coupled to the fixed frame 31 by plates 35, 36 and flexible tongues 37–40 and movable in the direction of arrow di. The reference numeral 32 denotes a lens holding frame holding a correction optical system 33 (which corresponds to the correction optical system ILNS of FIG. 2) and coupled to the movable frame 37 by plates 41, 42 and flexible tongues 43–46 and movable in the direction of arrow dj relative to the movable frame 37.

The reference numeral 51 designates a motor for driving the moveable frame 37 in the direction of arrow di. The motor 51 corresponds to the image stabilizing motor IMTR, and is fixed to the flat portion 31i of the fixed frame 31 through a motor bed 47. A cam 52 (which corresponds to the cam CAM of FIG. 2) and a pulley 53 are secured to the output shaft 51a of the motor 51, and the cam surface 52a of the cam 52 bears against a cam follower 54 mounted on the fixed frame 37, and the fixed frame 37 is moved in the direction of arrow di by the rotation of the motor shaft 51a and the cam 52. One end of a spring 56 is coupled to the fore end of wire 55 wound on the pulley 53, and the other end of the spring 56 is hooked on a spring hook 57 studded in the fixed frame 37, whereby a bearing force works between the cam 52 and the cam follower 54. The pulley 53 and wire 55 used here are means which produces such a torque that will negate a torque produced in the cam 52 by said bearing force, and the detailed mechanism thereof is described in the prior application (Japanese Laid-Open Patent Application No. 3-37619) by Applicant and therefore need not be described herein.

The reference numeral 58 denotes a slit plate secured to the movable frame 37. This slit plate 58 corresponds to the slit SLT of FIG. 2, and detects the position of the movable frame 37 in the direction of arrow di in a conventional manner by an infrared light emitting diode 59 (which corresponds to the infrared light emitting diode IRED of FIG. 2), a position sensor 60 (which corresponds to the position sensor PSD of FIG. 2) and a slit 58a in the slit plate 58.

The reference numeral 61 designates a motor for driving the lens holding frame 32 in the direction of arrow dj. The motor 61 is fixed to the flat portion 31j of the fixed frame 31 through the motor bed 48. A cam 62 and a pulley 63 are likewise secured to the motor shaft 61a of the motor 61, and the cam 62 is brought into contact with a cam follower 64 by wire 65, a spring 66 and a spring hook 67. The cam follower 64 is provided not on the lens holding frame 32, but on an intermediate lever 71. The intermediate lever 71 is coupled to the fixed frame 31 through a flexible tongue 72 and is pivotable in the direction of arrow $\theta j$, and intermediate bearings 73 and 74 are mounted on the lever 71. These bearings bear against the flat portion 32j of the lens holding frame 32. Consequently, by the rotation of the cam 62, the cam follower 64, the intermediate lever 71 and the intermediate bearings 73, 74 are displaced as a unit in the direction of arrow $\theta j$, and this moves the lens holding frame 32 in the direction of arrow dj. The displacement of the movable frame 37 in the direction of arrow di is absorbed between the flat portion 32j of the lens holding frame 32 and the intermediate bearings 73, 74 and therefore, the interference between the movement in the direction of arrow di and the movement in the direction of arrow dj is avoided. Also, a slit plate 68 is secured to the lens holding frame 32, and the displacement of the lens holding frame 32 in the direction of arrow dj is detected by an infrared light emitting diode 69 and a position sensor 70.

The reference numeral 81 denotes a lock plate forming a part of a lock mechanism for holding the correction optical system 33 at the origin when image stabilization is not effected. The lock plate 81 is secured to the lens holding frame 32 and has a lock aperture 81a therein. The reference numeral 82 designates a lock pin movable back and forth in the direction of the photographing optical axis C in a lock pin pedestal, not shown, which is secured onto the fixed frame 31.

The reference numeral 83 denotes a lock pin fork having a cut-away 83a engageable with a groove 82b formed in the small-diametered portion 82a of the lock pin 82 when the lock pin 82 is inserted into the lock aperture 81a, and by a lock knob, not shown, secured to the upper surface of the lock pin fork being slidden in the direction of the optical axis C, the lock pin is moved back and forth in the direction of the optical axis C. When the lock knob, the lock pin fork 83 and the lock pin 82 are moved leftwardly as viewed in FIG. 3, the large-diametered portion 82d of the lock pin 82 mates with the lock aperture 81a of the lock plate 81, thereby locking the correction optical system 33 at the origin position. At this time, the main switch SWIS is OFF.

On the other hand, when the lock knob, the lock pin fork 83 and the lock pin 82 are moved rightwardly as viewed in FIG. 3, the mating of the large-diametered portion 82d of the lock pin 82 with the lock aperture 81a is released and the locking of the lock plate 81 is released and thus, the movement of the correction optical system 33 in the shift direction becomes possible. Also, if the right end portion 82e of the lock pin 82 closes the main switch SWIS and the image stabilization control circuit ICNT starts its operation and image stabilization becomes possible and the image stabilization starting switch (the switch SWMT of FIG. 1) is closed, the correction optical system ILNS will be driven and image stabilization will be started.

In the above-described construction, the vibration of the lens in the direction I is detected by the angular acceleration meter li and the motor 51 is driven on the basis of this vibration signal, whereby the fixed frame 37 and the lens holding frame 32 is driven in the direction of arrow di, and also the vibration of the lens in the direction J is detected by the angular acceleration meter lj and the motor 61 is driven, whereby the lens holding frame 32 is driven in the direction of arrow dj through the intermediate lever 71. The two-dimensional vibration on the photographing image field can be corrected by the image stabilizing operation in the directions of these two axes.

The principle of the correction of the influence of gravity which is the object of the present invention will now be described with reference to the block diagrams of FIGS. 4 and 5.

Figure 4:
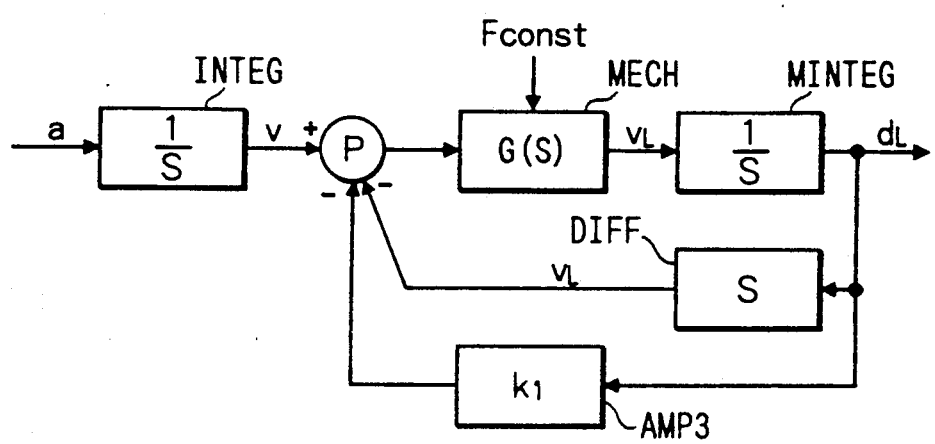
FIG. 4 is a block concept diagram of the conventional image stabilization control.
Figure 5:
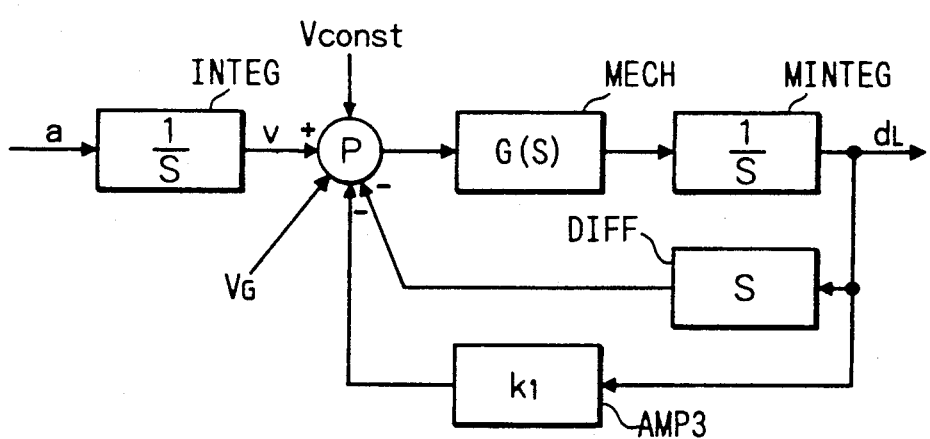
FIG. 5 is a block concept diagram of the image stabilization control of the present invention.

FIG. 4 corresponds to an example of the prior art which does not have gravity correcting means.

First, the angular acceleration signal a detected by the angular acceleration meter is input to the integrator INTEG, and is input as an angular velocity signal v to a block MECH by way of the addition point P. The block MECH shows an image stabilizing mechanism portion including the phase compensating circuit COMPE, the image stabilizing motor IMTR, the correction optical system ILNS, etc. of FIG. 1. When the correction optical system ILNS is driven at a velocity vL by the operation of this mechanism portion, the displacement signal dL of the correction optical system ILNS is produced by the mechanical integrating action (indicated by a block MINTEG) of the mechanism portion. This displacement signal dL is differentiated by the differentiator DIFF and creates a velocity signal vL, which is inverted and input to the addition point P and forms a feedback loop. Also, the displacement signal dL is multiplied by a coefficient k1 in the amplifier AMP3 and is inverted and input to the addition point P, whereby slow center feedback is formed.

In the above-described construction, the influence of gravity upon the correction optical system ILNS is represented as disturbance Fconst input to the block MECH of FIG. 4.

This disturbance Fconst does not depend on the frequency of vibration, the velocity signal vL and the displacement signal dL of the correction optical system ILNS, etc., but always keeps a constant value. Consequently, the disturbance Fconst can be substituted for by disturbance Vconst input to the addition point P as shown in FIG. 5, by effecting predetermined coefficient conversion. Accordingly, by a signal VG for negating the disturbance Vconst being input to the addition point P, the disturbance Vconst, i.e., the influence of gravity G upon the correction optical system ILNS, can be negated.

Describing here the meaning of the disturbance Vconst, in the present embodiment, it is the motor IMTR and the cam CAM that drives the correction optical system ILNS and therefore, the disturbance Vconst corresponds to an applied voltage to the motor for the motor IMTR to hold the correction optical system ILNS at a certain position. This disturbance Vconst can be known beforehand from the characteristic of the motor IMTR, the shape of the cam CAM and the weight of the correction optical system ILNS and therefore, the signal VG corresponding to the disturbance Vconst can be memorized in the image stabilizing microcomputer ICPU.

The control flows of the camera body CMR and lens LNS in the above-described construction will now be described with reference to the flow charts of FIGS. 6 and 7.

When the power source switch, not shown, of the camera body CMR side is closed, power supply to the microcomputer CCPU in the camera is started and the microcomputer CCPU in the camera starts to execute the sequence program stored in the ROM.

Figure 6:
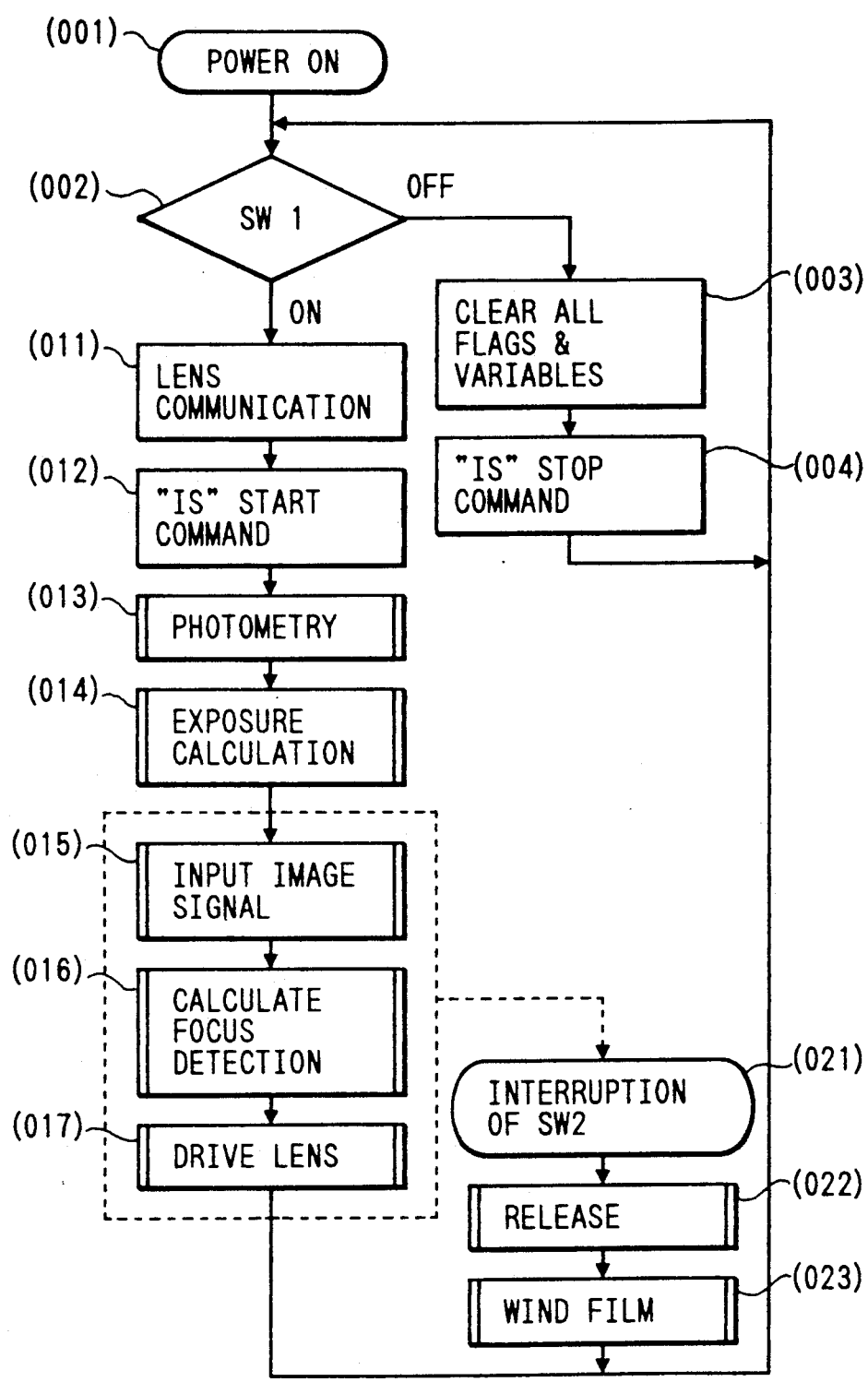
FIG. 6 is a flow-chart showing the operation of the camera side in the first embodiment of the present invention.

FIG. 6 is a flow chart showing the general operation of the camera body CMR side.

When the power source switch, not shown, is closed, the operation of a step (002) and so forth is started via a step (001).

At the step (002), the state of the switch SW1 adapted to be closed by the first-stage depression of the release button is detected, and if the switch SW1 is OFF, shift is made to a step (003), where all flags and variables for control set in the RAM in the microcomputer CCPU in the camera are cleared and initialized and advance is made to a step (004).

At the step (004), a command for stopping the image stabilizing operation (IS) is transmitted to the lens LNS side.

The steps (002)–(004) are repetitively executed until the switch SW1 becomes ON or the power source switch becomes OFF.

Also, by the switch SW1 being closed, shift is made from the step (002) to a step (011).

At the step (011), lens communication is effected. This communication is a communication for obtaining information necessary to effect exposure control (AE) and focus adjustment control (AF), and when the microcomputer CCPU in the camera delivers a communication command to the microcomputer LCPU in the lens through the signal line DCL, the microcomputer LCPU in the lens transmits information such as the focal length, the AF sensitivity and the fully open F number into the ROM through the signal line DLC.

At a step (012), a command for starting the image stabilizing operation is transmitted to the lens LNS side.

At a step (013), the "photometry" subroutine for exposure control is executed. That is, the microcomputer CCPU in the camera inputs the output of the photometry sensor SPC shown in FIG. 2 to the analog input terminal, A/D-converts it and obtains the digital photometry value Bv thereof.

At a step (014), the "exposure calculation" subroutine for obtaining an exposure control value is executed. In this subroutine, a shutter value Tv and an aperture value Av are determined in accordance with an apex calculation expression "Av+Tv=Bv+Sv" and a predetermined program graph, and these are stored into the predetermined addresses of the RAM.

At a step (015), the "image signal input" subroutine is executed. In this subroutine, the microcomputer CCPU in the camera effects the inputting of an image signal from the focus detecting sensor SNS.

At a step (016), the defocus amount of the photo-taking lens is calculated on the basis of the input image signal.

The subroutine of the steps (015) and (016) is disclosed in U.S. Pat. No. 4,812,869 by Applicant and therefore need not be described in detail herein.

At a step (017), the "lens driving" subroutine is executed. In this subroutine, the driving pulse number of the focus adjusting lens FLNS calculated at the step (016) on the camera body CMR side is only transmitted to the microcomputer LCPU in the lens, whereafter the microcomputer LCPU in the lens drive controls the motor FMTR in accordance with predetermined acceleration and deceleration curves. After the termination of the driving, a termination signal is transmitted to the microcomputer CCPU in the camera, and this subroutine is terminated and return is made to the step (002).

Description will now be made of a case where the release interruption by the closing of the switch SW2 is applied when each operation in the focus adjusting cycle shown in the steps (015)–(017) encircled by a broken line is being executed.

The switch SW2, as previously described, is connected to the interrupt input terminal of the microcomputer in the camera, and design is made such that when this switch SW2 is closed, shift is immediately be made to a step (021) by the interrupting function even if any step is being executed.

When the switch SW2 interruption is applied during the execution of the steps encircled by the broken line, shift is made to a step (022) via the step (021).

At the step (022), the release operation is performed.

At a step (023), film winding is effected to thereby terminate photographing by one frame, and return is made to the step (002).

The subroutines of the steps (013) to (017) and the steps (022) and (023) are already known and need not be described in detail.

Description will now be made of the image stabilizing operation performed on the lens LNS side.

In this first embodiment, there is provided posture detecting means, and a gravity correction signal is produced on the basis of an output signal from the posture detecting means before the start of image stabilization and further, gravity correction is effected on the basis of the gravity correction signal.

Figure 7:
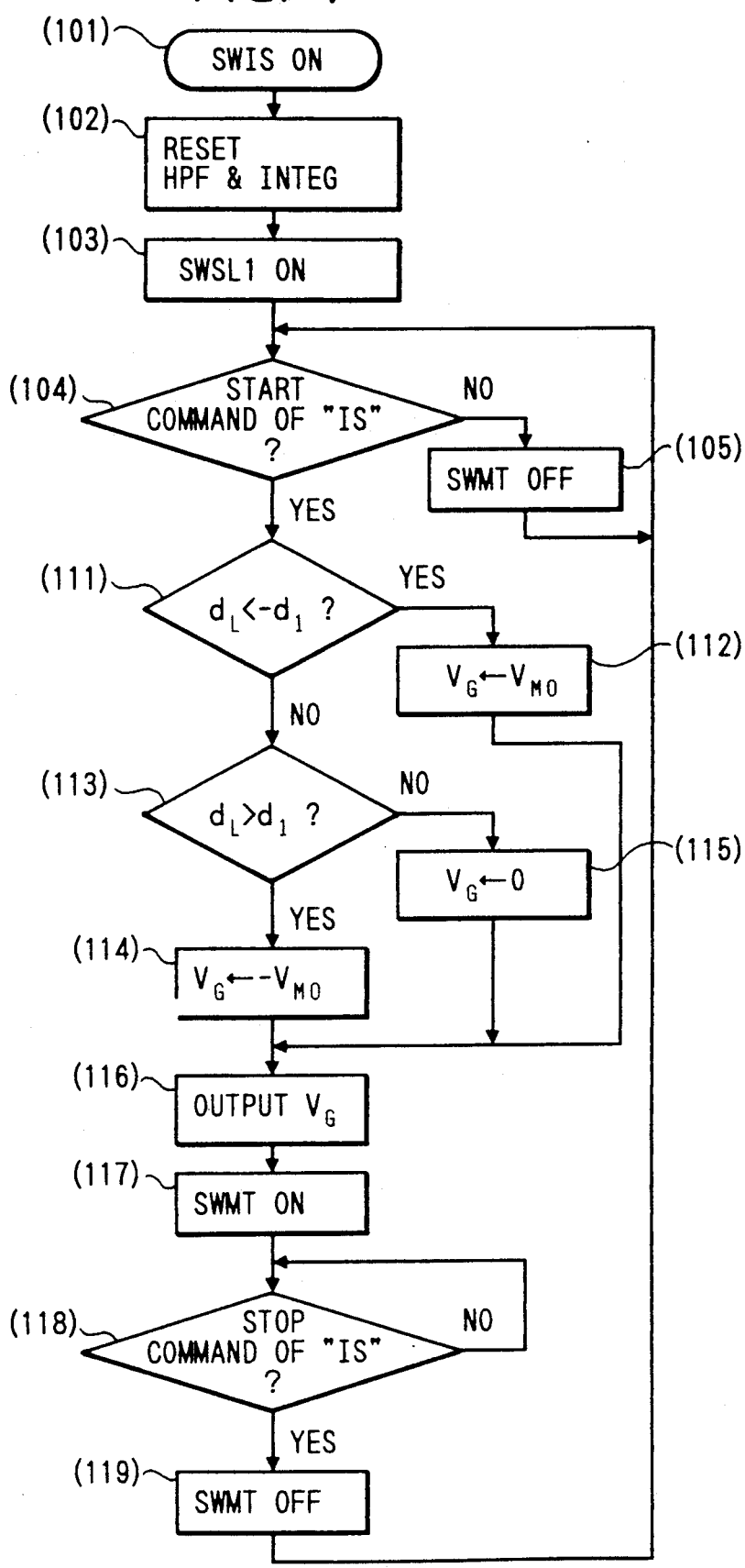
FIG. 7 is a flow chart showing the operation of the lens side in the first embodiment of the present invention.

The flow chart of FIG. 7 shows that correcting operation.

At a step (101), by the closing of the main switch SWIS for image stabilization, the power source is supplied to the image stabilizing microcomputer ICPU and its surrounding circuits.

At a step (102), the high-pass filter HPF and the integrator INTEG are reset by reset signal lines RES1 and RES2, and the angular acceleration signal a' and the vibration angular velocity v' are initialized to "0".

At a step (103), the switch SWSL1 is closed by the signal line SL1.

At a step (104), the discrimination of the IS starting command is effected and if the IS starting command has not come from the camera body CMR, shift is made to a step (105).

At the step (105), the switch SWMT is opened and the inputting of the control signal to the motor IMTR is prohibited.

The steps (104)–(105) are repetitively executed as long as the IS starting command does not come. In this state, image stabilization is not effected, but the angular acceleration meter ACC, the high-pass filter HPF and the integrator INTEG are operating and the output signals a, a' and v' thereof continue to be delivered.

When the IS starting command is communicated from the camera body CMR, shift is made from the step (104) to a step (111), where the discrimination of the initial position of the lens is effected and the direction of gravity G is foreseen. This discrimination standard will now be described with reference to FIG. 8.

Figure 8:
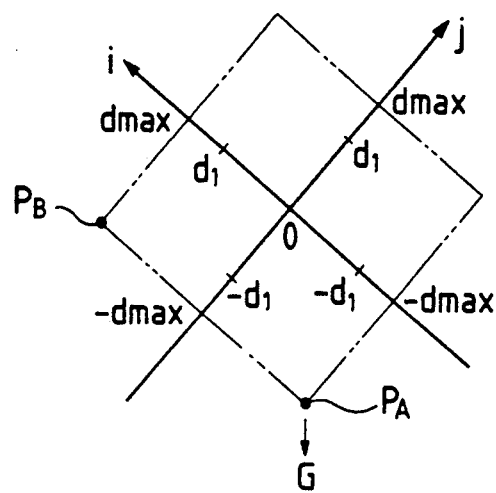
FIG. 8 illustrates the displacement of the optical member in the first embodiment of the present invention for gravity.

FIG. 8 represents the position coordinates axes when the correction optical system ILNS is seen from the camera body CMR side.

In this embodiment, the image stabilization coordinates axis in two-dimensional direction is set as an axis inclined by 45° with respect to the direction of gravity, and an axis i and an axis j indicate the directions of this image stabilization. The possible driving range of the correction optical system ILNS is the range of ±dmax both in the directions of the axes i and j. When the camera is levelled at its usual posture, the direction of gravity is the direction, indicated by arrow G and therefore, the position of the correction optical system ILNS is such that from the gravity thereof, both of positions dLi and dLj in the directions of the axes i and j are −dmax, i.e., the position of a point PA. On the other hand, when the camera is levelled with the release button at the top, i.e., with the right side of the camera above, the correction optical system is positioned at a point PB, i.e., dLi=dmax and dLj=−dmax. For the movable range±dmax of the correction optical system ILNS, the discrimination standard for detecting the direction of gravity is±d1 inside the range±dmax. That is, when in each of the axes i and j, the initial position of the lens is outside±d1, it is judged that gravity faces in that direction.

Turning back to the flow chart of FIG. 7, it at a step (111), "dL<−d1", shift is made to a step (112). ( At the step (112), since the fact that "dL<−d1" means in the present embodiment that the correction optical system ILNS deviates toward the motor IMTR side, a voltage VMO necessary for the motor IMTR to raise and hold the correction optical system ILNS is stored into a register VG for memorizing the correction signal, and shift is made to a step (116).

Also, if at the step (111), the judgment is "NO", shift is made to a step (113).

At the step (113) , whether "dL>d1" is discriminated, and if the answer is "YES", shift is made to a step (114) with the direction of gravity being regarded as opposite to that at the step (112).

At the step (114), "−VMO" is stored into the register VG. The above-mentioned "VMO" and "−VMO" are values memorized in advance in the image stabilizing microcomputer ICPU.

If at the step (113), the judgment is "NO", that is, "−d1≧dL≧d1", shift is made to a step (115) with the direction of gravity being regarded as indefinite.

At the step (115), "0" is stored into the register VG. This corresponds to the case of aerophotography, close-up photography or the like in which the photographing optical axis faces in the direction of gravity and the influence of gravity does not extend to an actuator for driving the correction optical system.

At a step (116), the content of the register VG set at the step (112) or the steps (114) and (115), i.e., the signal VG which provides a correction voltage, is output to the addition point P3.

At a step (117), when the switch SWMT of FIG. 1 is closed, an image stabilization signal is applied to the motor IMTR and the feedback loop is closed, whereby image stabilization is started. Immediately before image stabilization is started, the correction optical system ILNS deviates in the direction of gravity, but with the start of image stabilization, the image stabilization signal, the gravity correction signal and the center feedback signal are input while being superposed one upon another, and the image stabilizing operation is performed while the correction optical system ILNS is slowly moving from its deviated position to the origin position, and after the lapse of a predetermined time, image stabilization is effected in a state in which the average position of the correction optical system ILNS is "0".

At a step (118), whether an IS stopping command has come from the camera body CMR is discriminated, and if this signal is not yet received, the program stays at the step (118) and image stabilization is continued. If at the step (118), the reception of the IS stopping command is recognized, shift is made to a step (119).

At the step (119), the switch SWMT is opened to thereby stop the motor IMTR and stop image stabilization, and return is made to the step (104).

As described above, the direction of gravity is foreseen from the displacement of the correction optical system ILNS immediately before the start of image stabilization and a signal which negates the influence of gravity G is added to the control system, whereby the effect of gravity correction can be obtained from immediately before the start of image stabilization.

In the foregoing description, the operation with respect to one of the image stabilization axes in the two-dimensional direction has been described, but of course, similar control is also effected with respect to the other image stabilization axis. That is, in reality, with regard to the steps (105) and (119) in the flow of FIG. 7, the operations in the two directions i and j are successively executed in each of these steps, but in this flow, the operations in the two directions are collectively described to avoid difficulty.

In the above-described first embodiment, a correction optical system moved in a direction perpendicular to the optical axis has been used as optical axis eccentricity means for image stabilization, but the gravity action eliminating means of the present invention is also applicable to optical axis eccentricity means of any other type.

Figure 9:
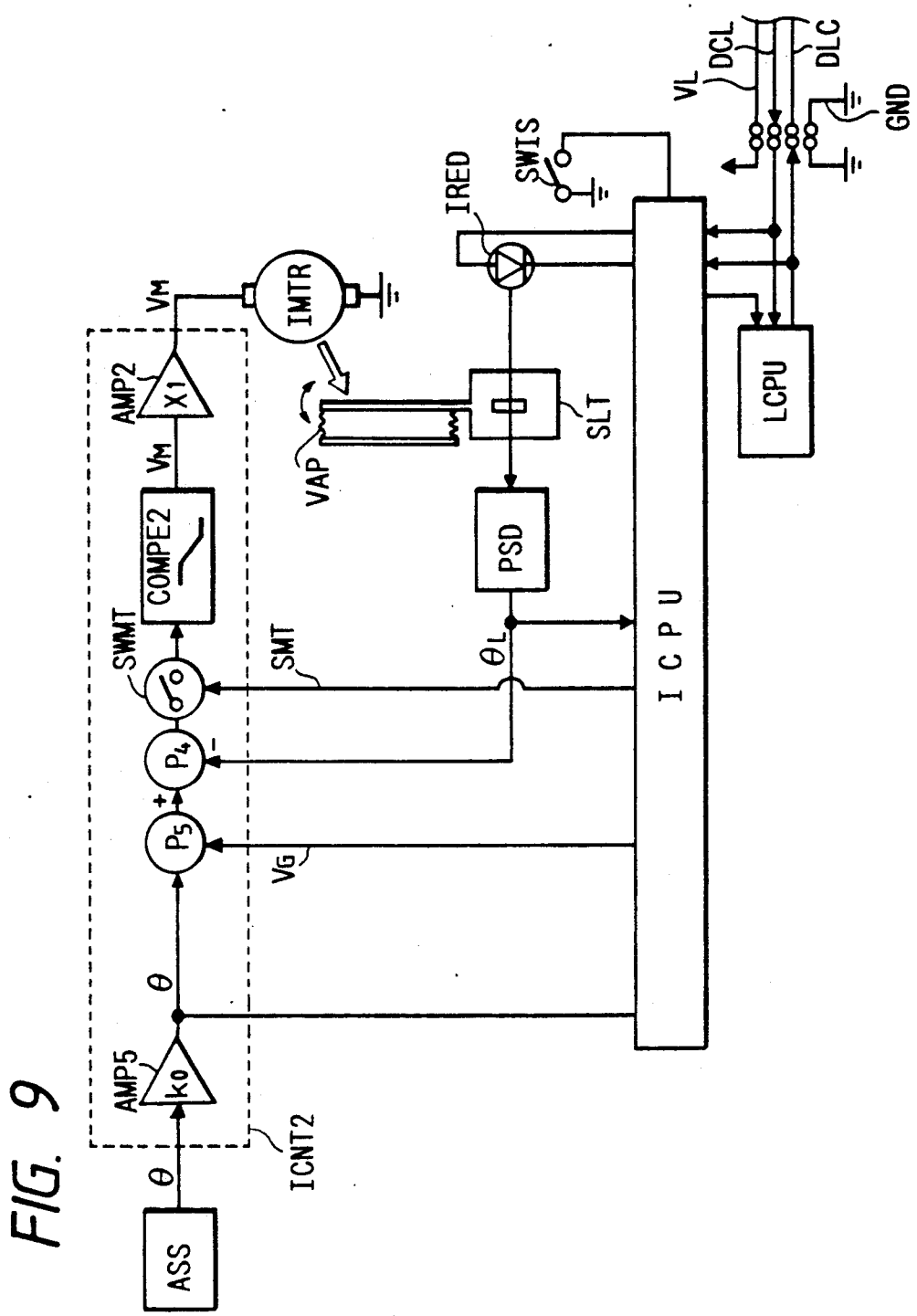
FIG. 9 is a block diagram showing an image stabilization control circuit in a second embodiment of the present invention and its surrounding circuits.

FIG. 9 shows an image stabilization control circuit ICNT and its surrounding circuits in a second embodiment of the present invention, and in FIG. 9, members functionally similar to those in FIG. 1 which shows the first embodiment are given similar reference characters.

In this second embodiment, an angular displacement meter as shown in Japanese Laid-Open Patent Application No. 3-172703 filed by Applicant is used as the vibration detecting sensor, and a variable vertical angle prism as described in Japanese Laid-Open Patent Application No 2-59718 is used as the optical axis eccentricity means. is the angular displacement of vibration that is detected by the vibration detecting sensor and therefore, the drive control of the variable vertical angle prism which is the optical axis eccentricity means is (angular) displacement control.

In FIG. 9, ASS designates an angular displacement meter which has the slow center feedback function as shown in Japanese Laid-Open Patent Application No. 1-310597 and which is designed such that the mean value of the angular displacement signal $\theta'$ thereof is "0".

AMP5 denotes a coefficient converting amplifier for converting the angular displacement of the vibration of the lens barrel into the control angular displacement command signal $\theta$ of a variable vertical angle prism VAP, and the signal $\theta$ which is the output thereof is input to a phase compensating circuit COMPE2 via addition points P5 and P4 and the switch SWMT. The output signal VM of the phase compensating circuit COMPE2 provides an applied voltage to the motor IMTR, and the variable vertical angle prism VAP is driven by the motor IMTR.

The variable vertical angle prism VAP is comprised of two transparent plane parallel plates, accordion-like film and enveloped liquid, and by the plane parallel plates being inclined, the optical axis is deflected to thereby make the image on the imaging plane eccentric, thus effecting image stabilization.

When the plane parallel plates are inclined, a slit SLT integral therewith is displaced and a signal ΘL corresponding to the angular displacement of the plane parallel plates is output from a position sensor PSD. This signal θL is inverted and input to the addition point P4, and a feedback loop is formed.

Design is made such that two angular displacement signals θ and θL are input to the image stabilizing microcomputer ICPU and the ON-OFF of the switch SWMT is controlled by the control line SMT of the switch SWMT and also a correction signal VG is output to the addition point P5.

Figure 10:
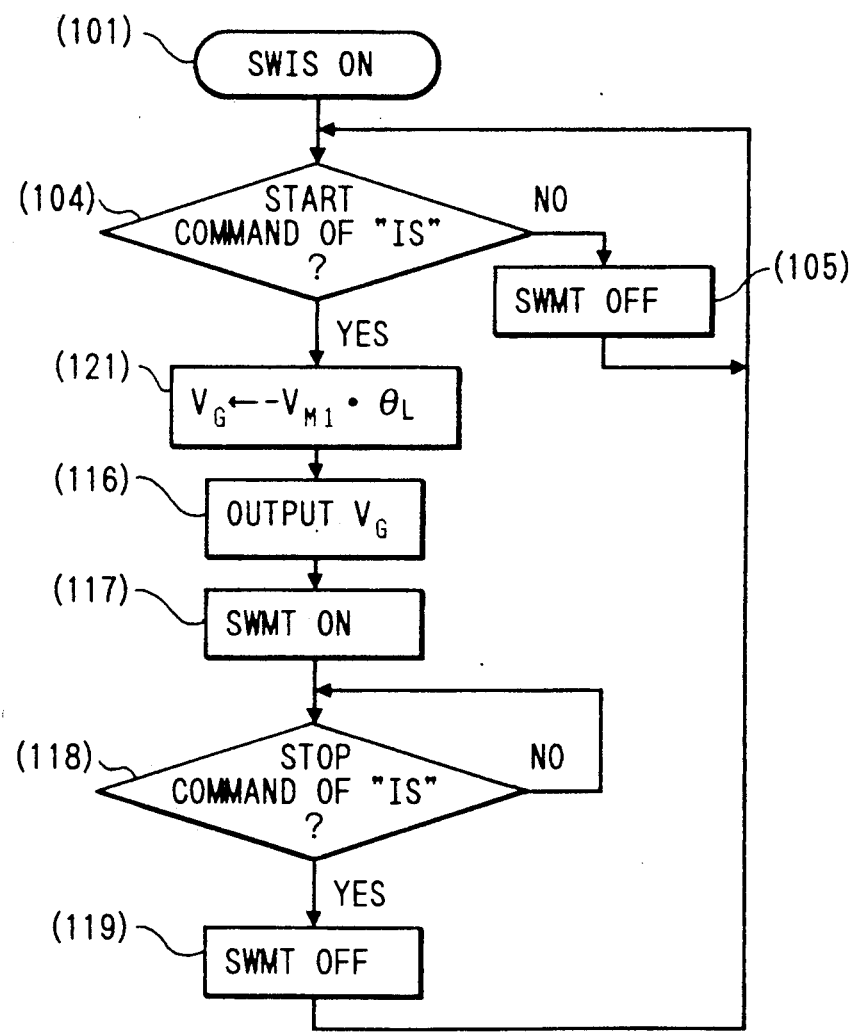
FIG. 10 is a flow chart showing the operation of the lens side in the second embodiment of the present invention.

FIG. 10 is a flow chart showing the operation of the lens LNS side in the second embodiment, and steps at which operations similar to those in the first embodiment of FIG. 7 are given similar step numbers.

At a step (101), by the closing of the main switch SWIS for image stabilization, the power source is supplied to the image stabilizing microcomputer ICPU and its peripheral circuits. Thereupon, the angular displacement sensor ASS starts its vibration detecting operation and produces an output θ'.

At a step (104), the discrimination of the IS starting command is effected and if the IS starting command has not come from the camera body CMR, return is made to the step (104) via a step (105), and these steps (104) and (105) are repetitively executed to wait.

When the IS starting command is communicated from the camera body CMR, shift is made from the step (104) to a step (121) for setting the correction signal VG.

The influence of the variable vertical angle prism VAP upon gravity will now be described.

The two plane parallel plates constituting the variable vertical angle prism VAP have their rotational axes within or in the vicinity of their thickness range and therefore are substantially balanced relative to gravity. However, the liquid enveloped between the two plane parallel plates tries to fall from gravity and as a result, the lower sides of the two plane parallel plates open. On the other hand, the accordion-like film enveloping the liquid has a springy property and tries to preclude the plane parallel plates from opening toward one side. Accordingly, the plane parallel plates open and stop at an angle at which the gravity of the liquid and the spring force of the accordion-like film are balanced with each other. If the posture of the camera is changed, the influence of gravity will also change and the opening angle will also change. Consequently, if the opening angle, i.e., the angular displacement of the plane parallel plates, is detected, the degree of the influence of gravity can be known and the magnitude of the correction signal VG can be determined.

At a step (121), a value obtained by a correction voltage coefficient VM1 being multiplied by the angular displacement θL of the plane parallel plates of the variable vertical angle prism VAP is stored into the register VG.

Thereafter, as in the first embodiment, steps (116)–(118) are executed to thereby perform the image stabilizing operation, and when the IS stopping command is received from the camera body CMR, shift is made from the step (118) to a step (119), where image stabilization is stopped and return is made to the step (104).

In the above-described first and second embodiments, the direction of gravity has been foreseen from the displacement during the inoperative time of the optical axis eccentricity means for image stabilization, but it is also possible to detect the posture of the camera by the use of an inclination meter or the like and correct the influence of gravity.

Figure 11:
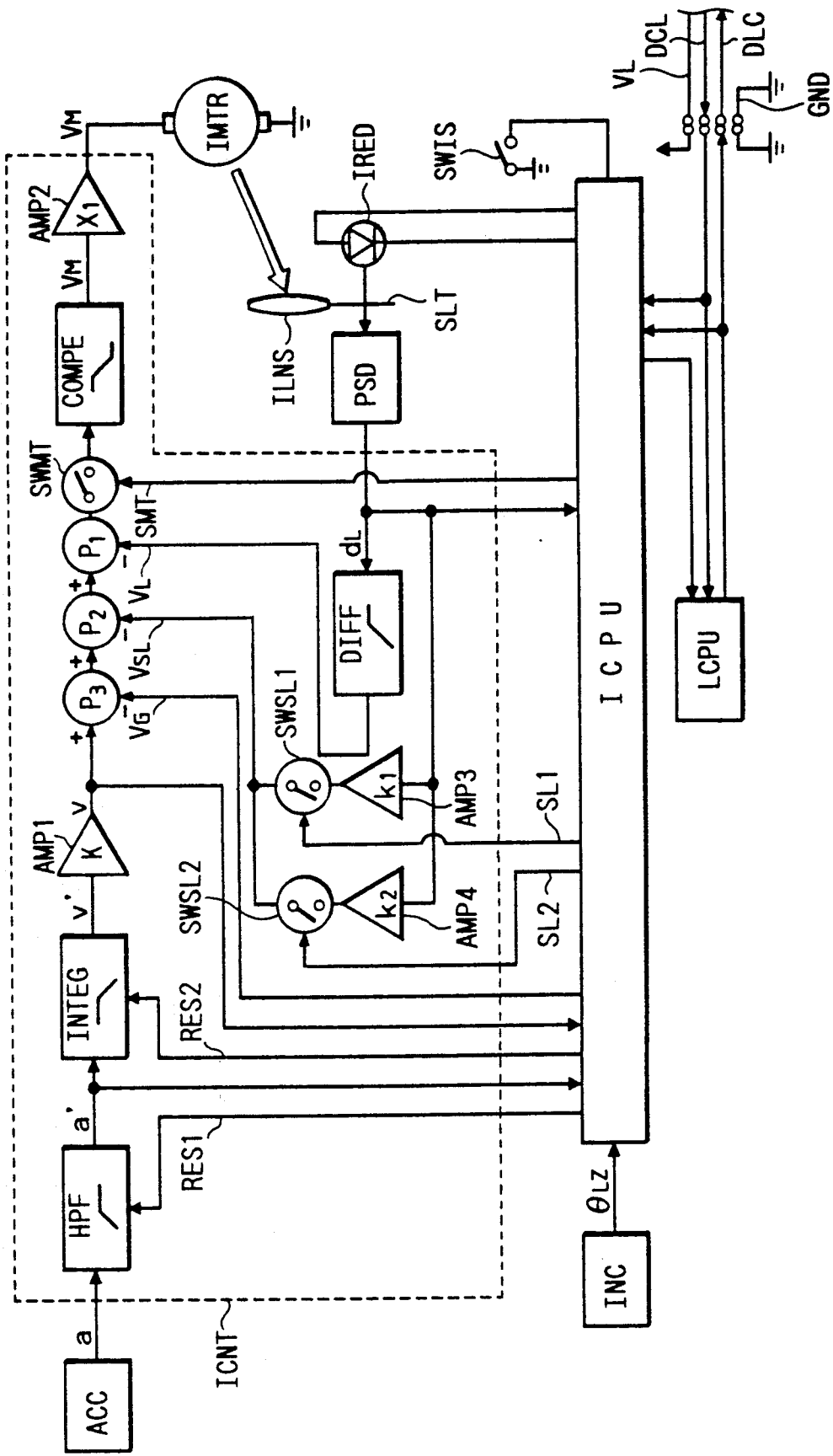
FIG. 11 is a block diagram showing an image stabilization control circuit in a third embodiment of the present invention and its surrounding circuits.

FIG. 11 is a block diagram showing the construction of the essential portions of a third embodiment of the present invention, and in this embodiment, an inclination meter INC is added (to the first embodiment).

The inclination meter INC puts out an output θLZ to the image stabilizing microcomputer ICPU in conformity with the posture of the lens LNS. It is to be understood that the output θLZ becomes "0°" when gravity acts in the direction of the driving shaft of the correction optical system ILNS.

Figure 12:
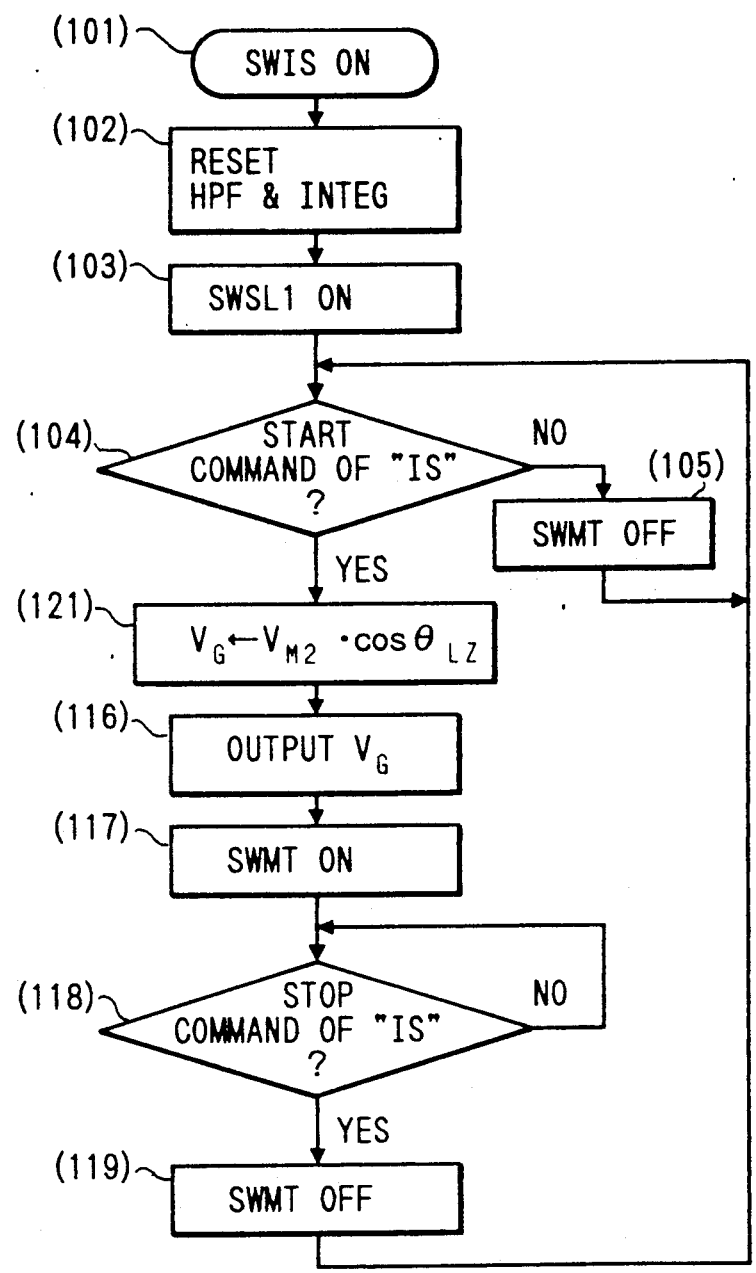
FIG. 12 is a flow chart showing the operation of the lens side in the third embodiment of the present invention.

FIG. 12 is a flow chart showing the operation of the lens LNS side in the third embodiment, and this flow chart differs from the operation of the lens LNS side in the first embodiment, i.e., the flow chart of FIG. 7, only in that the steps (111)–(115) are substituted for by a step (121) and therefore, this difference alone will be described herein.

When at the step (104), the reception of the IS starting command is discriminated, shift is made to a step (121).

At the step (121), "VM2·COSθLZ" is calculated from a correction voltage coefficient VM2 and an angle of inclination θLZ, and it is stored into the register VG. It has been previously described that the output θLZ is designed to become "θLZ=0" when the direction of gravity and the direction of image stabilization coincide with each other. Consequently, when "θLZ=0°", "VG=VM2, and the amount of correction for gravity becomes greatest. On the other hand, when "θLZ=90°", "VG=0" and no correction is applied.

If the inclination meter INC is thus used, more accurate correction will become possible.

Also, an accelerometer may be used in lieu of the inclination meter INC. In the first embodiment, an angular acceleration meter is used to detect the angular vibration of the camera and therefore, a discrete linear accelerometer is used for the detection of the posture of the camera, i.e., the detection of the direction of gravity. On the other hand, where two linear accelerometers are used for the detection of the angular vibration of the camera and the angular vibration is calculated from the difference signal therebetween, these linear accelerometer can also detect the posture of the camera.

According to each of the above-described embodiments, the image stabilizing apparatus has posture detecting means therefor and is provided with gravity correcting means having the function of negating the influence of gravity in the image stabilizing apparatus from immediately after the start of image stabilization on the basis of the result of the detection by the posture detecting means immediately before the start of image stabilization and therefore, without the optical axis eccentricity means for image stabilization being influenced by gravity, the average position of the movement locus thereof coincides with the center of the movable range and thus, the movable range becomes effectively usable.

Also, in the first and second embodiments, the position detecting means (the position sensor PSD and the infrared light emitting diode IRED) for the optical axis eccentricity means (the correction optical system ILNS) used during image stabilization is used as the posture detecting means and therefore, any new posture detecting means need not be provided.

Further, in the third embodiment, the inclination meter INC is used as the posture detecting means and therefore, accurate correction of gravity becomes possible.

The optical axis eccentricity means in the present invention also includes the variable vertical angle prism and consequently, includes means for deflecting the optical axis.

A fourth embodiment of the present invention will now be described with reference to FIGS. 13, 14 and 15. With regard to the figures common to those for the first to third embodiments, use is made of those figures and the description thereof.

According to the present embodiment, in an image stabilizing apparatus having light beam deflecting means for deflecting a light beam by moving an optical member, provision is made of detecting means for detecting the arrival of the optical member at the end of the movable range thereof which is a set moved position and further detecting the direction and frequency of the arrival, and provision is also made of control means for controlling the driving characteristic of the light beam deflecting means in conformity with the output of said detecting means and the output of vibration detecting means. The control means controls the driving characteristic of the light beam deflecting means in conformity with how many times on end the optical member has arrived at the end of the movable range in a particular direction during image stabilization.

In the present embodiment, as in the first embodiment, provision is made of the image stabilization control circuit shown in FIG. 1, the support mechanism for the correction system of FIG. 3 and the position coordinates axes of the correction optical system of FIG. 8. The description of FIGS. 1, 3 and 8 overlaps the description of the first embodiment and therefore is omitted here.

Figure 13:
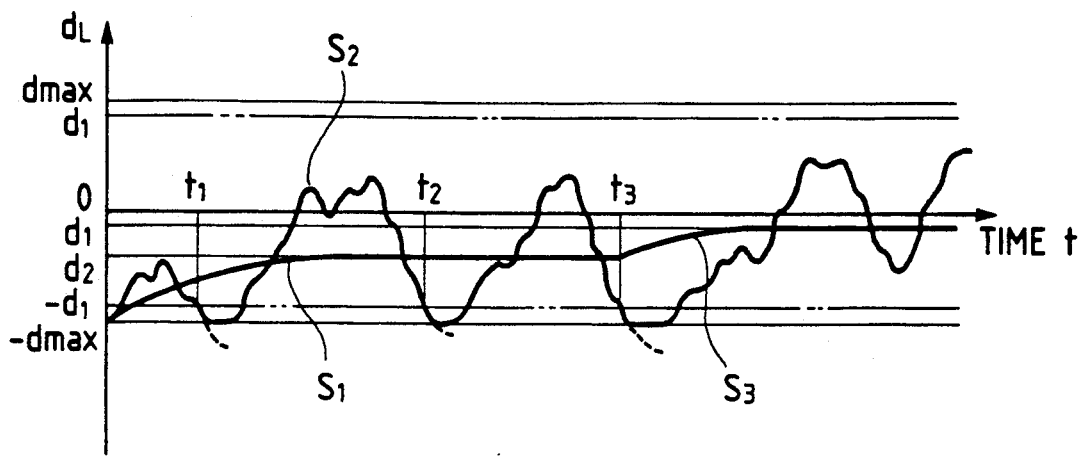
FIG. 13 shows the movement locus of an optical member in a fourth embodiment of the present invention during image stabilization.

FIG. 13 shows the movement locus of the correction optical system ILNS during image stabilization in the fourth embodiment, and in this figure, the abscissa represents time t and the ordinate represents the displacement dL of the correction optical system ILNS on one of the two-dimensional image stabilization axes. The origin of the ordinate,±dmax and±d1, as described in connection with FIG. 8, indicate the center of the movable range, the ends of the movable range and the discriminated positions of striking, respectively.

In FIG. 13, at the time "t=0" which is the time when image stabilization is started, the correction optical system ILNS is positioned at the lowest point "dL=−dmax" in the movable range from gravity. When image stabilization is started from "t=0", if no vibration occurs, the displacement dL slowly goes toward the original by the action of the slow center feedback as indicated by a locus S1, but since the correction optical system ILNS is pulled downwardly by gravity, it becomes balanced at the position of "dL=d2" whereat the slow center feedback and gravity are balanced with each other.

On the other hand, the displacement of the correction optical system ILNS when there is hand vibration is along a locus S2 comprising movement for image stabilization superposed on the locus S1. The average position of the locus S2 also is d2 downwardly deviated from the origin and therefore, the margin on the lower side of the movable range (movable area) is little, and when the amplitude of hand vibration is great the collision against the stroke end in the lower direction occurs frequently and accurate image stabilization becomes impossible. (In the present embodiment the speed of vibration is controlled and therefore, as long as a downward (negative) speed signal is produced (the section indicated by dotted line) after the correction optical system ILNS has struck against the lower end the correction optical system ILNS does not move while remaining struck against the lower end but when an upward (positive) speed signal is produced, the correction optical system ILNS begins to move toward the origin and image stabilization is resumed.)

So, in the present embodiment design is made such that the direction and frequency of striking when the correction optical system ILNS strikes against the movable stroke end are detected and when the striking occurs a predetermined number of times or more in the same direction it is judged that the average driving position deviates and a correction signal (VG) which will eliminate this deviation is output to a circuit for driving the correction optical system ILNS.

That is, as shown in FIG. 13 when the striking occurs downwardly a predetermined number of times e.g. three times, a correction signal for raising the correction optical system ILNS upwardly by a minute amount is given at a time T3 when the third striking is recognized. Thereupon, the average value of the locus of the correction optical system ILNS is raised as indicated by a locus S3 and d3 becomes balanced.

Thus, the correction optical system ILNS is driven at a place nearer to the movable center position and the movable range becomes effectively usable. This means that the range in which image stabilization can be effected has been widened.

The operation during panning will now be described with reference to FIG. 14.

Figure 14:
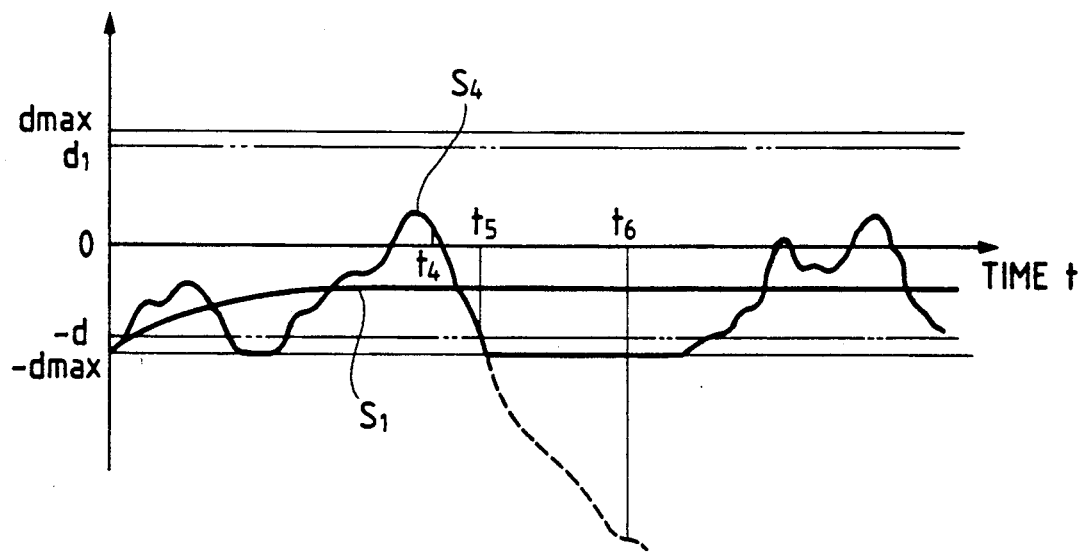
FIG. 14 shows the movement locus of the optical member in the fourth embodiment of the present invention during image stabilization as during panning.

FIG. 14 is a graph similar to FIG. 13, and represents the locus of the correction optical system ILNS when the photographer effects panning.

In FIG. 14, it is to be understood that ordinary image stabilization is effected during time t0 to time t4, but the photographer has performed the panning operation between time t4 to time t6. Thereupon, the image stabilizing apparatus effects ordinary image stabilization to preclude the movement of the image by the panning, but after the correction optical system strikes against the movable stroke end immediately after time t5, image stabilization becomes impossible, and image stabilization remains impossible until the panning is terminated and an upward speed signal is produced. The displacement dL of the correction optical system ILNS during the panning is saturated to−dmax for a long time and the average value thereof also inclines greatly toward the negative, but the frequency of striking is only counted as once. That is, in the present embodiment, design is made such that correction does not become sensitive to the long-time displacement deviation during the panning, but correction becomes sensitive when as shown in FIG. 13, the saturation of displacement occurs frequently in the same direction due to the influence of gravity or the like.

The image stabilizing operation performed on the lens LNS side will now be described with reference to the flow chart of FIG. 15.

The basic principle of the correction of the influence of gravity has already been described with reference to FIGS. 4 and 5 which show the first embodiment and therefore, need not be described here.

At a step (101), by the closing of the main switch SWIS for image stabilization, the power source is supplied to the image stabilizing microcomputer ICPU and its peripheral circuits, and the image stabilizing microcomputer ICPU starts to execute a predetermined program.

At a step (102), the high-pass filter HPF and the integrator INTEG are reset by the reset signal lines RES1 and RES2 and the outputs a′ and v′ thereof are initialized into "0".

At a step (103), all flags and all variables in the image stabilizing microcomputer ICPU are cleared and set to "0".

At a step (104), "0" is stored into the register VG for memorizing a correction signal which will be described later and the register VG is initialized.

At a step (105), the switch SWIS is closed to thereby close the slow center feedback loop.

At a step (106), the discrimination of an image stabilization (IS) starting command is effected, and if the IS starting command has not come from the camera body CMR, shift is made to a step (107).

At the step (107), the switch SWMT is opened to thereby prohibit the inputting of a control signal to the motor IMTR and prohibit the image stabilizing operation, and return is made to the step (106), and the steps (106) and (107) are repetitively executed. In this state, image stabilization is not being effected, but yet the angular acceleration meter Acc, the high-pass filter HPF and the integrator INTEG are operating and the output signals a, a′ and v′ thereof continue to be output.

When the IS starting command is received from the camera body CMR during the execution of the steps (106) and (107), shift is made from the step (106) to a step (111).

At the step (111), a correction signal VG is output from the image stabilizing microcomputer ICPU to the addition point P3. However, at this point of time, "VG=0".

At a step (112), the switch SWMT is closed. Thereby, a control signal is input to the motor IMTR and the feedback loop is closed, so image stabilization is started.

At a step (113), the displacement dL of the correction optical system ILNS is stored into the register D1.

At a step (114), discrimination between the magnitudes of the content dL of the register DL and the displacement d1 (see FIG. 13 or 14) is effected and if as a result, it is judged that "|DL|>d1", that is, the correction optical system ILNS strikes against the movable stroke end, shift is made to a step (115), and if "|DL|≦d1", shift is made to a step (120).

At the step (115), the renewal of a counter ICTR for counting the frequency of striking of the correction optical system ILNS is effected. "DL/|DL|" represents "+1" when DL is positive, and represents "−1" when DL is negative and therefore, when the correction optical system ILNS strikes in the direction of +d1, +1 is added to the counter ICTR, and when the correction optical system ILNS strikes in the direction of −d1, "−1" is added to the counter ICTR.

At a step (116), the content of the counter ICTR is discriminated and if as a result, "|ICTR|≧3", that is, the correction optical system ILNS has struck three times in a predetermined direction as described in connection with FIG. 13, shift is made to a step (117), and if "|ICTR|≦2", shift is made to a step (119).

At the step (117), the modification of the correction signal VG is effected. ΔVG is a VG modifying unit voltage memorized in the ROM of the image stabilizing microcomputer ICPU, and "ICTR/|ICTR|" represents "+1" when the content of the counter ICTR is positive, and represents "−1" when the content of the counter ICTR is negative. Consequently, when "ICTR≦−3", that is, when the correction optical system ILNS has struck three times in the direction of −d1, ΔVG is added to VG. Thus, such a correction signal VG which will raise the correction optical system ILNS upwardly is output. Also, when "ICTR≧3", that is, when the correction optical system ILNS has struck upwardly three times, ΔVG is subtracted from VG. This represents that the camera is being used with its top and bottom inverted.

At a step (118), the counter ICTR is cleared. This is because the hunting phenomenon of the correction optical system ILNS will occur if the correction of VG is effected too frequently, and is for the purpose of clearing the counter ICTR once VG has been modified, thereby preventing the modification from being applied for a little while.

At a step (119), discrimination between the magnitudes of the displacement dL of the correction optical system ILNS at that point of time and the displacement d1 is effected, and if "|dL|>d1", that is, if the correction optical system is still in its striking state, the program stays at this step, and if "|dL|≦d1", that is, if the correction optical system has come out of its striking state, shift is made to the step (120).

At the step (120), whether an IS stopping command has been received from the camera body CMR is discriminated, and if the answer is "NO", return is made to the step (113), where the flow of the steps (113)–(119) is repetitively executed while image stabilization is continued. Also, if the reception of the IS stopping command is recognized, shift is made to a step (121).

At the step (121), the switch SWMT is opened to thereby stop the image stabilizing operation, and return is made to the step (106).

Outlining the above-described control flow again, design is made such that when the frequency of the striking of the correction optical system ILNS is counted and the striking has occurred a predetermined number of times (in the present embodiment, three times) in one direction, a driving modification signal (correction signal VG) in the opposite direction is produced to approximate the average value of the driving displacement of the correction optical system ILNS to the center of the movable range.

In the above-described fourth embodiment, when the correction optical system ILNS strikes against the upper end and lower end in the movable range alternately, the content of the counter ICTR only increases and decreases alternately and the absolute value thereof does not increase and accordingly, the modification of the correction signal VG is not effected. However, the fact that the correction optical system ILNS frequently strikes against the upper end and lower end alternately means the situation that panning or framing change is effected frequently and that the photographer's hand vibration is great or the photographer rides on a greatly shaking vehicle or the like, and in either case, accurate correction of vibration is not effected.

Accordingly, in a fifth embodiment which will be described below, design is made such that when striking has occurred a predetermined number of times or more often within a predetermined time, the frequency band of vibration correction is changed to thereby decrease the frequency of striking.

Description will hereinafter be made with reference to the flow charts of FIGS. 16 and 17.

Figure 15:
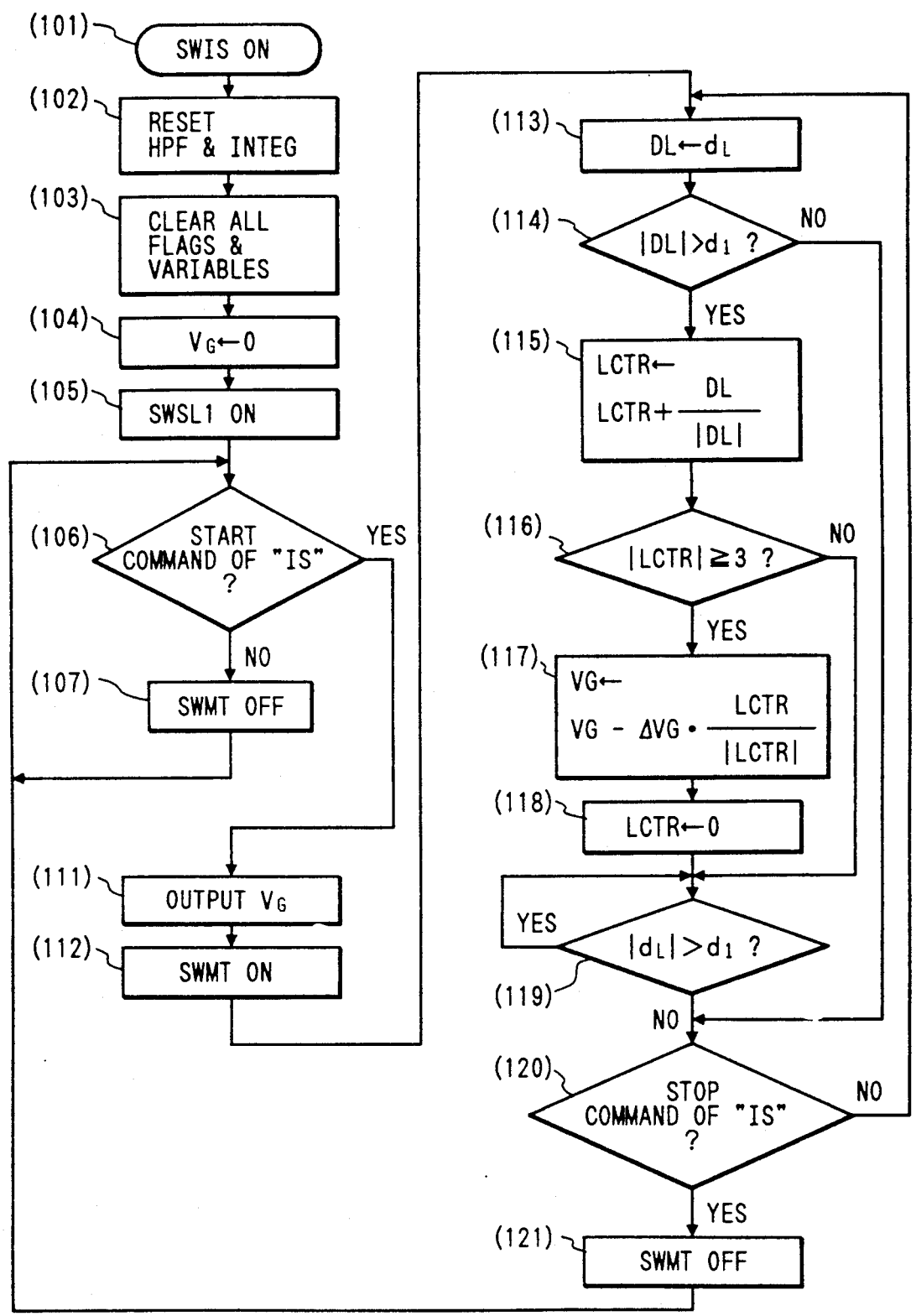
FIG. 15 is a flow chart showing the operation of the lens side in the fourth embodiment of the present invention.
Figure 16:
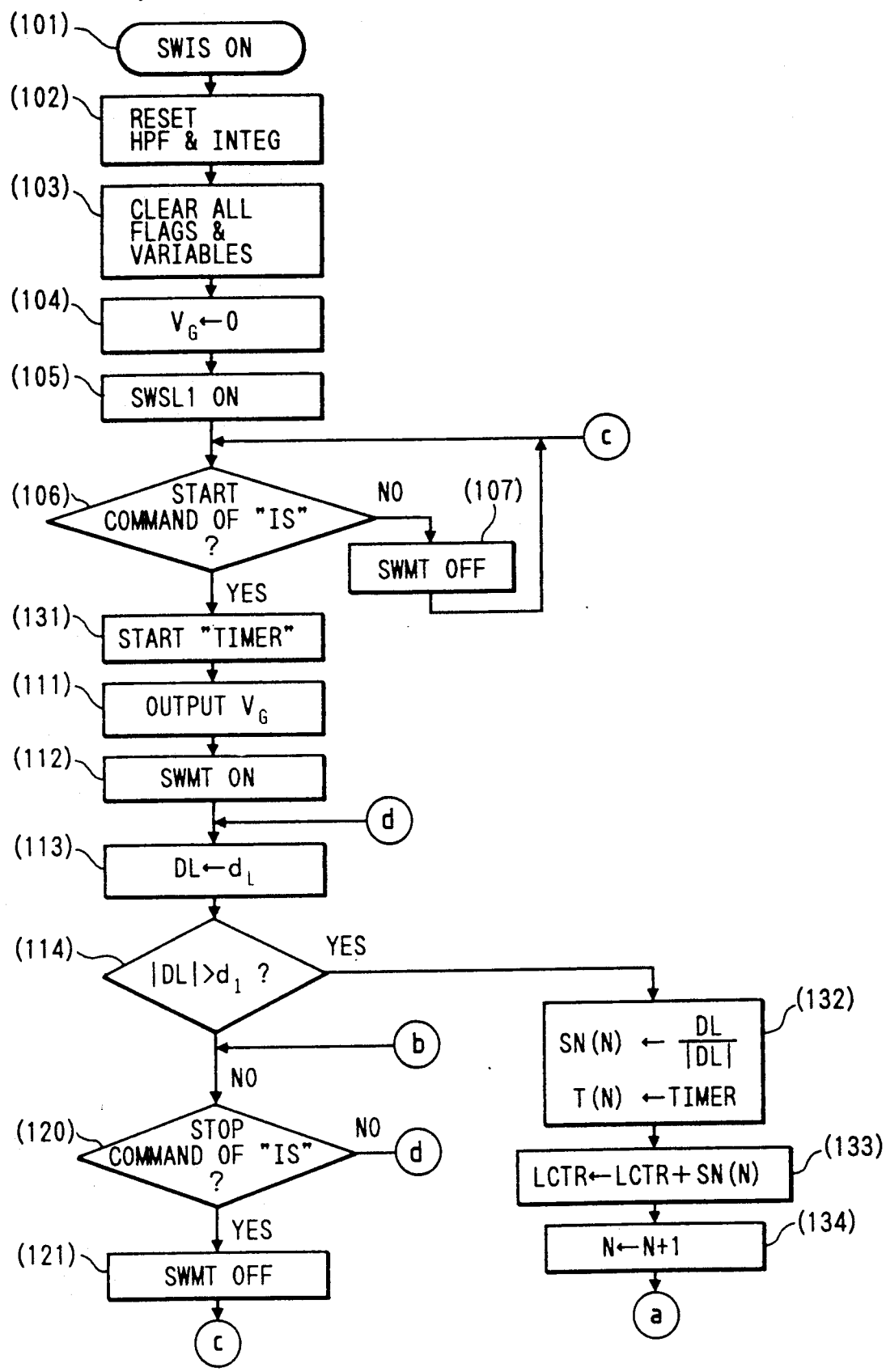
FIG. 16 is a flow chart showing the operation of the lens side in a fifth embodiment of the present invention.

In FIG. 16, steps for effecting operations similar to those in FIG. 15 are given similar step numbers. Steps (101) to (107) are the same as those in the fourth embodiment of FIG. 15 and therefore need not be described.

When at a step (106), the IS starting command is received from the camera body CMR, shift is made to a step (131).

At the step (131), a self-running timer TIMER contained in the image stabilizing microcomputer ICPU is started, and shift is made a step (111).

At the step (111), a correction signal VG is output from the image stabilizing microcomputer ICPU to the addition point P3.

At a step (112), the switch SWMT is closed. Thereby, a control signal is input to the motor IMTR and the feedback loop is closed and therefore, image stabilization is started.

At a step (113), the displacement dL of the correction optical system ILNS is stored into the register DL.

At a step (114), discrimination between the magnitudes of the content dL of the register DL and the displacement d1 is effected, and if as a result, it is judged that "$|DL|>d1$", that is, the correction optical system ILNS strikes against the movable stroke end, shift is made to a step (132), and if "$|DL|\leq d1$", shift is made to a step (120).

At the step (132), a value indicative of the direction of striking of the correction optical system ILNS is first stored into a register SN(N). That is, if DL is positive, "$DL/|DL|$" represents "+1", and if DL is negative, "$DL/|DL|$" represents "−1" and therefore, this is stored into the register SN(N). Here, N is a first counter for counting the frequency of striking, and since at the step (103), N is cleared to "N=0", this is first stored into a register SN(O). Subsequently, the value of the timer TIMER representative of the current time is stored into a register T(O).

At a step (133), SN(N) defined at the step (132) is added to a second counter LCTR for counting the frequency of striking of the correction optical system ILNS. The difference between the counters N and LCTR is that N simply counts only the frequency of striking, whereas LCTR is a counter which counts not only the frequency of striking but also the direction of striking. This step (133) corresponds to the step (115) of FIG. 15 in the fourth embodiment.

Figure 17:
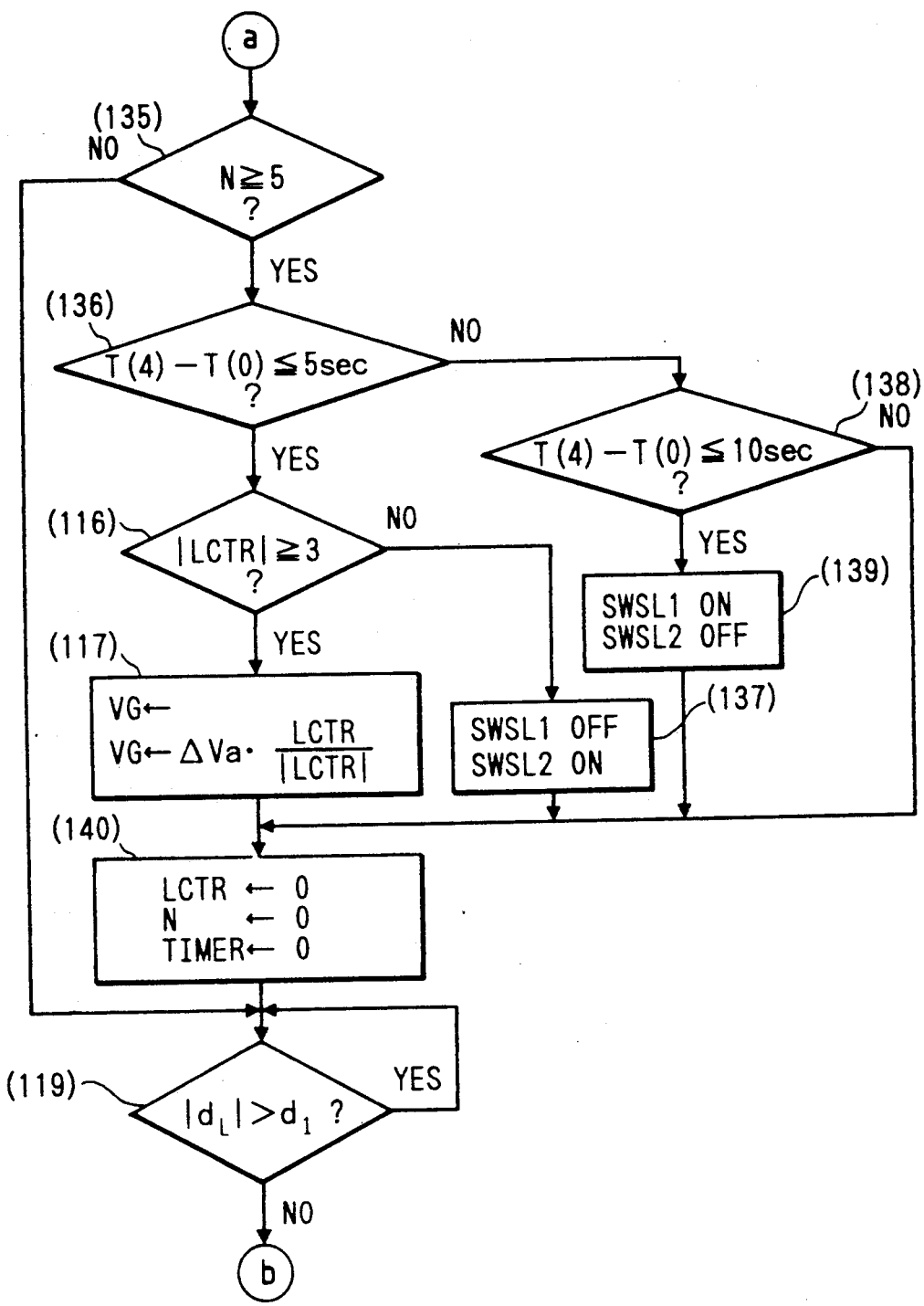
FIG. 17 is a flow chart showing the continuation of the operation shown in FIG. 16.

At a step (134), the counter N is advanced by 1, and shift is made to the step (135) of FIG. 17.

At the step (135), the count N, i.e., the frequency of striking, is judged, and if it is "4" or less, shift is made to a step (119), and if it is "5" or more, that is, if striking has occurred five times, shift is made to a step (136).

At the step (136), the length of the time required for the first time (N=0) till the fifth time (N=4) in the fifth phenomena of striking is judged, and if this is e.g. "five seconds" or less, it is recognized that striking has occurred frequently, and shift is made to a step (116) to apply predetermined correction thereto, and if not so, shift is made to a step (138).

At the step (116), the content of the counter LCTR is discriminated. As described above, the direction of striking is also included in the counter LCTR. For example, if among five times of striking, striking has occurred four times in one direction and once in another direction, "$|LCTR|=4-1|=3$", and if striking has occurred three times in one direction and two times in another direction, "$|LCTR|=3-2|=1$". That is, it is seen that if $|LCTR|$ is great, there is an inclination in the direction of striking and that if $|LCTR|$ is small, the direction of striking is random. Accordingly, if at the step (116), the direction of striking inclines, that is, the answer is "YES", shift is made to a step (117), where the modification of the correction signal VG is effected as in the first embodiment.

On the other hand, if at the step (116), the answer is "NO", that is, if the correction optical system ILNS has struck against the both ends of the movable range a substantially equal number of times, shift is made to a step (137).

At the step (137), the switch SWSL1 of the loop for creating the slow center feedback in FIG. 1 is opened and the switch SWSL2 of said loop is closed. Thereupon, if hand vibration is great and the correction optical system ILNS frequently strikes against the both ends, the frequency of striking is decreased by the action of this step, because the second loop via the amplifier AMP4 has a stronger restitutive force. Here, strengthening the slow center feedback reduces the correcting ability for vibration of low frequency, but this is more preferable than striking occurs to make image stabilization entirely impossible.

On the other hand, if at the step (136), the answer is "NO", shift is made to a step (138).

At the step (138), the time required for the first to the fifth striking is judged, and if this time is as long as "ten seconds" or more and it is recognized that the frequency of striking is small, shift is made to a step (139), and if the interval of the first to the fifth striking is between five seconds to ten seconds, the operations of steps (117), (137) and (139) are not performed, and shift is made to a step (140).

At the step (139), switches SWSL1 and SWSL2 are changed over so as to weaken the slow center feedback. That is, the switch SWSL1 is closed and the switch SWSL2 is opened.

When striking has occurred five times and the steps (135) to (139) have been executed, shift is made to a step (140).

At the step (140), the counters LCTR and N and the self-running timer TIMER are cleared to "0", and shift is made to a step (119).

At the step (119), whether striking is going on is discriminated, and if the answer is "YES", the program stays at this step, and if the answer is "NO", shift is made to a step (120).

At the step (120), whether the IS stopping command has been transmitted from the camera body CMR is discriminated, and if the answer is "NO", shift is made to the step (113) to repeat the flow of the step (113) and subsequent steps, and if the answer is "YES", shift is made to a step (121).

At the step (121), the switch SWMT is opened to thereby stop image stabilization, and return is made to the step (106).

Outlining the above-described flow again, the frequency of striking of the correction optical system ILNS is detected while image stabilization is effected, and when said frequency has reached a predetermined number of times (in the present embodiment, five times), the direction of the first to the fifth striking and the required time are judged. If said required time is a predetermined value (e.g. five seconds) or less and the direction of striking inclines toward one side, the modification of the correction signal VG is effected and the average driving position of the correction optical system ILNS is modified. If said required time is the predetermined value or less and the direction of striking is random, the slow center feedback is strengthened. On the other hand, if said required time is a second predetermined value (e.g. ten seconds) or greater, the slow center feedback is weakened.

In the fifth embodiment, instead of the magnitude of the slow center feedback being changed, the frequency characteristic of the high-pass filter or the integrator INTEG may be changed to thereby decrease striking.

Also, the fifth embodiment adopts a form in which a new effect is added to the fourth embodiment, but only the added effect in the fifth embodiment may be used independently.

The light beam deflecting means in the present invention may be one which deflects the light beam by a variable vertical angle prism.

According to each of the above-described embodiments, provision is made of a counter for monitoring the position of the correction optical system ILNS during image stabilization and counting the direction and frequency of the displacement saturation of the correction optical system ILNS, and design is made such that the frequency and direction deviation of said displacement saturation are detected to thereby apply such correction which will decrease the frequency of striking and therefore, it becomes possible to use the movable range of the correction optical system ILNS effectively. Consequently, it becomes possible to accomplish stable image stabilization. Particularly, in the fourth embodiment, the displacement saturation in a predetermined direction is detected to thereby correct the influence of a steady disturbance factor by gravity or the like, and in the fifth embodiment, in addition to this, random displacement saturation is detected to thereby correct a sudden disturbance such as vibration of great amplitude or the like. Thus, correction is effected for disturbances differing in nature by different means and therefore, good image stabilization has become possible without reducing the image stabilizing ability.

What is claimed is:

1. An image stabilizing apparatus comprising:
   (A) image stabilizing means controllable for stabilizing an image by moving in an optical path;
   (B) direction of gravity detection means for detecting a direction in which gravity acts on said image stabilizing means during operation of said image stabilizing means; and
   (C) control means for changing a control of said image stabilizing means in response to an output of said direction of gravity detection means.

2. An apparatus according to claim 1, wherein said direction of gravity detecting means includes means for detecting a direction in which gravity acts on the basis of a state of said image stabilizing means during operation.

3. An apparatus according to claim 2, wherein said direction of gravity detection means includes means for detecting the direction of gravity in which gravity acts on the basis of a driving means position of said image stabilizing means.

4. An apparatus according to claim 3, wherein said direction of gravity detection means includes means for determining a direction of said image stabilizing means from a movable center position to said driving means position as a direction in which gravity acts.

5. An apparatus according to claim 3, wherein said direction of gravity detection means includes means for detecting the driving means position on the basis of an arrival of said image stabilizing means at a predetermined position.

6. An apparatus according to claim 3, wherein said direction of gravity detection means includes means for detecting the driving mean position on the basis of an arrival of said image stabilizing means at a position located near to an edge of a movable range.

7. An apparatus according to claim 4, wherein said direction of gravity detection means includes means for detecting a direction in which gravity acts on the basis of a record in which said image stabilizing means reaches the position located near to the edge of the movable range.

8. An apparatus according to claim 1, wherein said control means includes means for negating an influence said image stabilizing means receives from gravity in response to an output of said direction of gravity detection means.

9. An apparatus according to claim 6, wherein said control means includes means for applying a force on said image stabilizing means in a direction which is contrary to a direction of gravity detected by said direction of gravity detection means.

10. An apparatus according to claim 9, wherein said control means includes memory means for memorizing a magnitude of force applied in a direction which is contrary to a direction in which gravity acts.

11. An apparatus according to claim 6, wherein said control means includes means for substantially coinciding with the driving mean position of said image stabilizing means during operation of said image stabilizing means and a movable center position of said image stabilizing means.

12. An apparatus according to claim 1, further comprising image vibration detection means for detecting an image vibration, said image stabilizing means stabilizing an image in response to an output of said image vibration detection means.

13. An apparatus according to claim 1, wherein said image stabilizing means includes an optical member moving in the optical path in a plane which is substantially perpendicular to an optical axis.

14. An apparatus according to claim 1, wherein said image stabilizing means includes a variable angle prism.

15. An image stabilizing apparatus comprising:
   (A) image stabilizing means controllable for stabilizing an image by moving in an optical path;
   (B) direction of gravity detection means for detection a direction of gravity which acts on said image stabilizing means;
   (C) memory means for memorizing a magnitude of a force applied to said image stabilizing means so as to remove an influence said image stabilizing means receives from gravity; and
   (D) control means for controlling an action of said image stabilizing means in response to an output of said direction of gravity detection means and to the magnitude of force memorized by said memory means.

16. An apparatus according to claim 15, wherein said direction of gravity detection means includes means for detecting a direction in which gravity acts on the basis of a state of said image stabilizing means.

17. An apparatus according to claim 16, wherein said direction of gravity detection means includes means for detecting a direction in which gravity acts in response to a displacement of said image stabilizing means.

18. An apparatus according to claim 17, wherein said direction of gravity detection means includes means for detecting a direction of gravity in which gravity acts on the basis of a driving mean position of said image stabilizing means.

19. An apparatus according to claim 18, wherein said direction of gravity detection means includes means for determining a direction of said image stabilizing means from a movable center position to said driving mean position as a direction in which gravity acts.

20. An apparatus according to claim 17, wherein said direction of gravity detection means includes means for detecting a direction in which gravity acts in response to a displacement at a starting operation of said image stabilizing means.

21. An apparatus according to claim 20, wherein said direction of gravity detection means includes means for determining a direction from a movable center position of said image stabilizing means to a position at a starting operation of said image stabilizing means as a direction in which gravity acts.

22. An apparatus according to claim 15, wherein said control means includes means for applying a force, a magnitude of which is equal to a magnitude of the force memorized in said memory means, to a direction which is contrary to a direction of gravity detected by said direction of gravity detection means.

23. A camera comprising:
(A) image stabilizing means controllable for stabilizing an image by moving in an optical path;
(B) direction of gravity detection means for detection a direction of gravity which acts on said image stabilizing means during operation of said image stabilizing means; and
(C) control means for controlling an action of said image stabilizing means in response to an output of said direction of gravity detection means.

24. A camera comprising:
(A) image stabilizing means controllable for stabilizing an image by moving in an optical path;
(B) direction of gravity detection means for detection a direction of gravity which acts on said image stabilizing means;
(C) memory means for memorizing a magnitude of a force applied to said image stabilizing means so as to remove an influence said image stabilizing means receives from gravity; and
(D) control means for controlling an action of said image stabilizing means in response to an output of said direction of gravity detection means and to the magnitude of force memorized by said memory means.

25. A camera system comprising:
(A) image stabilizing means controllable for stabilizing an image by moving in an optical path;
(B) direction of gravity means for detecting a direction in which gravity acts on said image stabilizing means during operation; and
(C) control means for controlling an action of said image stabilizing means in response to an output of said direction of gravity detection means.

26. A camera system comprising:
(A) image stabilizing means controllable for stabilizing an image by moving in an optical path;
(B) direction of gravity detection means for detecting a direction of gravity which acts on said image stabilizing means;
(C) memory means for memorizing a magnitude of a force applied to said image stabilizing means so as to remove an influence said image stabilizing means receives from gravity; and
(D) control means for controlling an action of said image stabilizing means in response to an output of said direction of gravity detection means and to the magnitude of force memorized by said memory means.

27. An optical apparatus comprising:
(A) image stabilizing means controllable for stabilizing an image by moving in an optical path;
(B) direction of gravity detection means for detecting a direction of gravity which acts on said image stabilizing means during operation; and
(C) control means for controlling an action of said image stabilizing means in response to an output of said direction of gravity detection means.

28. An optical apparatus comprising:
(A) image stabilizing means for stabilizing an image by moving in an optical path;
(B) direction of gravity detection means for detecting a direction of gravity which acts on said image stabilizing means;
(C) memory means for memorizing a magnitude of a force applied to said image stabilizing means so as to remove an influence said image stabilizing means receives from gravity; and
(D) control means for controlling an action of said image stabilizing means in response to an output of said direction of gravity detection means and to the magnitude of force memorized by said memory means.

* * * * *

UNITED STATES PATENT AND TRADEMARK OFFICE
CERTIFICATE OF CORRECTION

PATENT NO. : 5,335,032

DATED : August 2, 1994

INVENTOR(S) : Ichiro Onuki et al.

It is certified that error appears in the above-identified patent and that said Letters Patent is hereby corrected as shown below:

Col. 1, line 54. Delete "is".

Col. 1, line 55. After "force" insert -- is --.

Col. 1, line 56. Change "1" to -- 1) --.

Col. 3, line 46. Delete " .. ".

Col. 4, line 61. Change "tens" to -- lens --.

Col. 4, line 66. After "movement" insert -- of the focusing lens --.

Col. 5, line 31. Delete "and".

Col. 5, line 32. After "camera" insert -- , --.

Col. 5, line 33. After "DMTR" insert -- , --.

Col. 5, line 44. Delete "-".

Col. 9, line 36. Change "slidden" to -- slid --.

Col. 12, line 7. Delete "be".

Col. 13, line 17. Delete "it".

Col. 13, line 18. Delete "(" (second occurrence) and start new paragraph with -- At the --.

Col. 13, line 37. Change "$\geq$" to -- $\leq$ -- (two occurrences).

UNITED STATES PATENT AND TRADEMARK OFFICE
CERTIFICATE OF CORRECTION

PATENT NO. : 5,335,032
DATED : August 2, 1994
INVENTOR(S) : Ichiro Onuki et al.

It is certified that error appears in the above-identified patent and that said Letters Patent is hereby corrected as shown below:

Col. 14, line 41.    After "means" insert -- It --.

Col. 16, line 47.    Change "accelerometer" to -- accelerometers --.

Col. 17, line 67.    After "great" insert -- , --.

Col. 18, line 2.    After "embodiment" insert -- , --.

Col. 18, line 6.    After "end" insert -- , --.

Col. 18, line 8.    After "end" insert -- , --.

Col. 22, line 2.    Change "=4-1|" to -- =|4-1| --.

Col. 22, line 4.    Change "=3-2|" to -- =|3-2| --.

Col. 24, line 8.    Change "claim 3" to -- claim 5 --.

Col. 24, line 10.    Change "mean" to -- means --.

Col. 24, line 13.    Change "claim 4" to -- claim 6 --.
    Col. 24, line 24.    Change "claim 6" to -- claim 8 --.
    Col. 24, line 33.    Change "claim 6" to -- claim 8 --.

Col. 24, line 35.    Change "mean" to -- means --.

Col. 24, line 53.    Change "detection" to -- detecting --.

Col. 25, line 13.    Change "mean" to -- means --.

Col. 25, line 35.    Change "detection" to -- detecting --.

UNITED STATES PATENT AND TRADEMARK OFFICE
CERTIFICATE OF CORRECTION

PATENT NO. : 5,335,032

DATED : August 2, 1994

INVENTOR(S) : Ichiro Onuki et al.

It is certified that error appears in the above-identified patent and that said Letters Patent is hereby corrected as shown below:

Col. 25, line 36. Change "of gravity which acts" to -- in which gravity acts --.

Col. 25, line 39. Change "controlling an action" to -- changing a control --.

Col. 25, line 45. Change "detection" to -- detecting --.

Col. 26, line 1. Change "the" to -- a --.

Col. 26, line 10. Change "controlling an action" to -- changing a control --.

Col. 26, line 26. Change "the" to -- a --.

Col. 26, line 33. Change "of gravity which acts" to -- in which gravity acts --.

Col. 26, line 35. Change "controlling an action" to -- changing a control --.

UNITED STATES PATENT AND TRADEMARK OFFICE
CERTIFICATE OF CORRECTION

PATENT NO. : 5,335,032
DATED : August 2, 1994
INVENTOR(S) : Ichiro Onuki et al.

It is certified that error appears in the above-indentified patent and that said Letters Patent is hereby corrected as shown below:

Col. 26, line 50. Change "the" to -- a --.

Signed and Sealed this

Seventh Day of February, 1995

Attest:

BRUCE LEHMAN

Attesting Officer

Commissioner of Patents and Trademarks